(12) United States Patent
Sun et al.

(10) Patent No.: US 12,279,294 B2
(45) Date of Patent: Apr. 15, 2025

(54) UPLINK RESOURCE CONFIGURATION

(71) Applicant: Telefonaktiebolaget LM Ericsson (PUBL), Stockholm (SE)

(72) Inventors: Ying Sun, Täby (SE); Yi-Pin Eric Wang, Fremont, CA (US); Yutao Sui, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 358 days.

(21) Appl. No.: 17/765,297

(22) PCT Filed: Sep. 24, 2020

(86) PCT No.: PCT/SE2020/050895
§ 371 (c)(1),
(2) Date: Mar. 30, 2022

(87) PCT Pub. No.: WO2021/066705
PCT Pub. Date: Apr. 8, 2021

(65) Prior Publication Data
US 2022/0377760 A1    Nov. 24, 2022

Related U.S. Application Data

(60) Provisional application No. 62/907,955, filed on Sep. 30, 2019.

(51) Int. Cl.
*H04W 4/00* (2018.01)
*H04L 5/14* (2006.01)
(Continued)

(52) U.S. Cl.
CPC ......... *H04W 72/543* (2023.01); *H04L 5/1469* (2013.01); *H04W 72/1268* (2013.01);
(Continued)

(58) Field of Classification Search
None
See application file for complete search history.

(56) References Cited

U.S. PATENT DOCUMENTS 9,668,285 B2    5/2017  Zhang et al.
9,854,595 B2   12/2017  Karlsson
(Continued)

OTHER PUBLICATIONS

3GPP TS 23.501 v16.2.0; Technical Specification; 3rd Generation Partnership Project; Technical Specification Group Services and Systems Aspects; System Architecture for the 5G System (5GS); Stage 2 (Release 16)—Sep. 2019.
(Continued)

*Primary Examiner* — Bob A Phunkulh
(74) *Attorney, Agent, or Firm* — Baker Botts L.L.P.

(57) ABSTRACT

A method performed by a network node (260, 800) is disclosed. The network node determines (701), based on one or more quality-of-service (QoS) parameters, an aggregated uplink (UL) scheduling pattern for a wireless device (210, 1000, 1100), the aggregated UL scheduling pattern for the wireless device comprising UL resources from a plurality of carriers. The one or more QoS parameters indicate one or more QoS requirements associated with a service. At least one of the one or more QoS parameters indicates a delay requirement 0 associated with the service.

20 Claims, 16 Drawing Sheets

(51) Int. Cl.
  *H04W 72/1268* (2023.01)
  *H04W 72/23* (2023.01)
  *H04W 72/543* (2023.01)
  *H04W 40/12* (2009.01)
  *H04W 74/02* (2009.01)

(52) U.S. Cl.
  CPC ............ *H04W 72/23* (2023.01); *H04W 40/12* (2013.01); *H04W 74/02* (2013.01)

(56) References Cited

U.S. PATENT DOCUMENTS

| | | | | |
|---|---|---|---|---|
| 11,030,460 | B1* | 6/2021 | Yoon | G06V 40/10 |
| 11,985,047 | B2* | 5/2024 | Ishizuka | H04L 41/5009 |
| 2010/0216405 | A1* | 8/2010 | Bhadra | H04W 52/241 |
| | | | | 455/63.1 |
| 2015/0029950 | A1* | 1/2015 | Rath | H04W 76/00 |
| | | | | 370/329 |
| 2015/0373713 | A1* | 12/2015 | Oh | H04L 1/1861 |
| | | | | 370/280 |
| 2016/0278088 | A1 | 9/2016 | Cheng et al. | |
| 2019/0268938 | A1* | 8/2019 | Zhao | H04W 74/02 |
| 2020/0059829 | A1* | 2/2020 | Joseph | H04W 36/08 |
| 2021/0142059 | A1* | 5/2021 | Lee | G06V 10/776 |
| 2022/0159621 | A1* | 5/2022 | Awad | H04L 1/0003 |
| 2022/0190969 | A1* | 6/2022 | Wei | H04L 1/1854 |
| 2022/0217736 | A1* | 7/2022 | Taherzadeh Boroujeni | |
| | | | | H04L 5/0094 |
| 2022/0232589 | A1* | 7/2022 | Yang | H04W 72/1268 |
| 2022/0295561 | A1* | 9/2022 | Wang | H04W 74/0866 |
| 2022/0417963 | A1* | 12/2022 | Wang | H04W 72/0453 |
| 2023/0199757 | A1* | 6/2023 | Van Phan | H04W 72/1268 |
| | | | | 370/329 |
| 2023/0269714 | A1* | 8/2023 | Rosa | H04W 72/0453 |
| | | | | 370/329 |

OTHER PUBLICATIONS

3GPP TS 38.331 v15.6.0; Technical Specification; 3rd Generation Partnership Project; Technical Specification Group Radio Access Network; NR; Radio Resource Control (RRC) protocol specification (Release 15)—Jun. 2019.
PCT International Search Report issued for International application No. PCT/SE2020/050895—Jan. 27, 2021.
PCT Written Opinion of the International Searching Authority issued for International application No. PCT/SE2020/050895—Jan. 27, 2021.
5G NR, The Next Generation Wireless Access Technology, Section 14.4 by Erik Dahlman, Stefan Parkvall and Johan Skold—Aug. 9, 2018.

* cited by examiner

UPLINK RESOURCE CONFIGURATION

PRIORITY

This nonprovisional application is a U.S. National Stage Filing under 35 U.S.C. § 371 of International Patent Application Serial No. PCT/SE2020/050895 filed Sep. 24, 2020 and entitled "UPLINK RESOURCE CONFIGURATION" which claims priority to U.S. Provisional Patent Application No. 62/907,955 filed Sep. 30, 2019 both of which are hereby incorporated by reference in their entirety.

TECHNICAL FIELD

The present disclosure relates, in general, to wireless communications and, more particularly, to uplink resource configuration.

BACKGROUND

The New Radio (NR) standard in the 3$^{rd}$ Generation Partnership Project (3GPP) is being designed to provide service for multiple use cases, such as enhanced mobile broadband (eMBB), ultra-reliable and low-latency communication (URLLC), and machine-type communication (MTC). Each of these services has different technical requirements. For example, the general requirement for eMBB is high data rate with moderate latency and moderate coverage, while URLLC service requires a low latency and high reliability transmission but moderate data rates.

One approach for low-latency data transmission is shorter transmission time intervals (TTIs). In NR, in addition to transmission in a slot, a mini-slot transmission is also allowed to reduce latency. A mini-slot may consist of any number of 1 to 14 orthogonal frequency division multiplexing (OFDM) symbols in the uplink (UL) and 2, 4, or 7 OFDM symbols in the downlink (DL). It should be noted that the concepts of slot and mini-slot are not specific to a specific service, meaning that a mini-slot may be used for eMBB, URLLC, or other services.

FIG. 1 illustrates an exemplary radio resource in NR.

The following description provides an overview of the Fifth Generation (5G) NR physical layer design. 3GPP is defining technical specifications for NR (e.g., 5G). In Release 15 (Rel-15) NR, a user equipment (UE) can be configured with up to four carrier bandwidth parts (BWPs) in the DL with a single DL carrier BWP being active at a given time. A UE can be configured with up to four carrier BWPs in the UL with a single UL carrier BWP being active at a given time. If a UE is configured with a supplementary UL, the UE can additionally be configured with up to four carrier BWPs in the supplementary UL with a single supplementary UL carrier BWP being active at a given time.

For a carrier BWP with a given numerology $\mu_i$, a contiguous set of physical resource blocks (PRBs) are defined and numbered from 0 to $N_{BWP,i}^{size}-1$, where i is the index of the carrier BWP. A resource block (RB) is defined as 12 consecutive subcarriers in the frequency domain.

Multiple OFDM numerologies, $\mu$, are supported in NR as given by Table 1 below, where the subcarrier spacing, $\Delta f$, and the cyclic prefix for a carrier BWP are configured by different higher layer parameters for DL and UL, respectively.

TABLE 1

Supported transmission numerologies.

| $\mu$ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

A DL physical channel corresponds to a set of resource elements carrying information originating from higher layers. The following DL physical channels are defined: Physical Downlink Shared Channel (PDSCH); Physical Broadcast Channel (PBCH); and Physical Downlink Control Channel (PDCCH). PDSCH is the main physical channel used for unicast DL data transmission, but also for transmission of random access response (RAR), certain system information blocks (SIBs), and paging information. PBCH carries the basic system information required by the UE to access the network. PDCCH is used for transmitting DL control information (DCI), mainly scheduling decisions, required for reception of PDSCH and for UL scheduling grants enabling transmission on the Physical Uplink Shared Channel (PUSCH).

An UL physical channel corresponds to a set of resource elements carrying information originating from higher layers. The following UL physical channels are defined: PUSCH; Physical Uplink Control Channel (PUCCH); and Physical Random Access Channel (PRACH). PUSCH is the UL counterpart to the PDSCH. PUCCH is used by UEs to transmit UL control information, including hybrid automatic repeat request (HARQ) acknowledgements, channel state information (CSI) reports, and other information. PRACH is used for random access preamble transmission.

An example of the contents of a DL DCI 1-0 is shown below:

Example contents of a DCI format 1-0 with CRC scrambled by C-RNTI/CS_RNTI

- Identifier for DCI formats—1 bits
  - The value of this bit field is always set to 1, indicating a DL DCI format
- Frequency domain resource assignment—$\lceil \log_2(N_{RB}^{DL, BWP}(N_{RB}^{DL, BWP} + 1)/2) \rceil$ bits
  - $N_{RB}^{DL, BWP}$ is the size of the active DL bandwidth part in case DCI format 1_0 is monitored in the UE specific search space and satisfying
    - the total number of different DCI sizes configured to monitor is no more than 4 for the cell, and
    - the total number of different DCI sizes with C-RNTI configured to monitor is no more than 3 for the cell
    otherwise, $N_{RB}^{DL, BWP}$ is the size of CORESET 0.
- Time domain resource assignment—4 bits as defined in Subclause 5.1.2.1 of TS 38.214
- VRB-to-PRB mapping—1 bit according to Table 7.3.1.1.2-33 of TS 38.214

| Example contents of a DCI format 1-0 with CRC scrambled by C-RNTI/CS_RNTI |
|---|
| - Modulation and coding scheme—5 bits as defined in Subclause 5.1.3 of TS 38.214
- New data indicator—1 bit
- Redundancy version—2 bits as defined in Table 7.3.1.1.1-2 of TS 38.214
- HARQ process number—4 bits
- Downlink assignment index—2 bits as defined in Subclause 9.1.3 of TS 38.213, as counter DAI
- TPC command for scheduled PUCCH—2 bits as defined in Subclause 7.2.1 of TS 38.213
- PUCCH resource indicator—3 bits as defined in Subclause 9.2.3 of TS 38.213
- PDSCH-to-HARQ_feedback timing indicator—3 bits as defined in Subclause 9.2.3 of TS 38.213 |

Both frequency division duplex (FDD) and time division duplex (TDD) are supported in NR. For TDD, unlike in Long-Term Evolution (LTE) which predefines a set of UL and DL configurations, the TDD operation is more flexible. The network, through radio resource control (RRC) signaling, can classify each symbol as "downlink", "flexible", or "uplink." "Flexible" means that the device should not make any assumptions on the direction of the transmission. The RRC parameters for TDD are given in 3GPP Technical Specification (TS) 38.331 V15.6.0 (2019-06), 3rd Generation Partnership Project; Technical Specification Group Radio Access Network; NR; Radio Resource Control (RRC) protocol specification (Release 15) as follows:

```
TDD-UL-DL-ConfigCommon ::= SEQUENCE {
    reference SubcarrierSpacing    SubcarrierSpacing,
    pattern1                       TDD-UL-DL-Pattern,
    pattern2                       TDD-UL-DL-Pattern OPTIONAL,
    ...
}
TDD-UL-DL-Pattern ::= SEQUENCE {
    dl-UL-TransmissionPeriodicity  ENUMERATED {ms0p5, ms0p625, ms1,
                                               ms1p25, ms2, ms2p5, ms5,
ms10},
    nrofDownlinkSlots              INTEGER (0..maxNrofSlots),
    nrofDownlinkSymbols            INTEGER (0..maxNrofSymbols-1),
    nrofUplinkSlots                INTEGER (0..maxNrofSlots),
    nrofUplinkSymbols              INTEGER (0..maxNrofSymbols-1),
    ...,
    [[
       dl-UL-TransmissionPeriodicity-v1530 ENUMERATED {ms3, ms4} OPTIONAL -- Need R
    ]]
}
maxNrofSlots INTEGER ::= 320   // Maximum number of slots in a 10 ms period
maxNrofSymbols-1 INTEGER ::= 13    // Maximum index identifying a symbol within a slot
                   (14 symbols, indexed from 0..13)
dl-UL-TransmissionPeriodicity : Periodicity of the DL-UL pattern
nrofDownlinkSlots : Number of consecutive full DL slots at the beginning of each DL-UL pattern
nrofDownlinkSymbols : Number of consecutive DL symbols in the beginning of the slot following
the last full DL slot
nrofUplinkSlots : Number of consecutive full UL slots at the end of each DL-UL pattern
nrofUplinkSymbols : Number of consecutive UL symbols in the end of the slot preceding the first full
UL slot.
```

Additional details of TDD operation in NR can be found in Chapter 7 of 5G NR: The Next Generation Wireless Access Technology by Erik Dahlman, Stefan Parkvall, and Johan Skold.

The following description provides an overview of scheduling in NR. Both dynamic scheduling and transmission without a dynamic grant are supported in 5G NR. Dynamic scheduling uses DCI carried by PDCCH to dynamically allocate resources in DL and/or UL. Dynamic scheduling is the main mode of operation in 5G NR, but it requires control signaling.

In some situations (e.g., if the traffic is periodic or the PDCCH resource is limited), it is desirable to avoid the dynamic control signaling. In the DL, semi-persistent scheduling is supported. The UE is preconfigured with DL resources that it can use to receive the DL traffic.

In the UL for PUSCH transmission, similar schemes are defined. More specifically, two schemes for transmission without a dynamic grant are specified in 5G NR: configured grant type 1; and configured grant type 2. With configured grant type 1, RRC signaling is used to provide the UL grant, including activation of the grant. With configured grant type 2, RRC signaling only provides the transmission periodicity, and L1/L2 control signaling is used to activate/deactivate the transmission.

Configured grant (CG) PUSCH transmission is also known as semi-persistent scheduling, UL without PDCCH, UL transmission without a dynamic grant, grant-free UL, and pre-configured UL resource in various literatures. The term used in this disclosure should not be regarded as limiting the concept.

Additional detail regarding transmission without a dynamic grant in NR can be found in Chapter 14.4 of 5G NR: The Next Generation Wireless Access Technology by Erik Dahlman, Stefan Parkvall, and Johan Skold.

The following description provides an overview of quality-of-service (QoS) requirements in 5G NR. In the 5G NR system, the lowest level granularity where policy and charging are imposed is a QoS flow. In 5G NR, QoS is imposed at the QoS flow level. Service Data Flows (SDFs) that share the same policy and charging rules can be transported in the same QoS flow. All traffic within the same QoS flow has the same treatment.

In 3GPP TS 23.501 V16.2.0 (2019-09), 3rd Generation Partnership Project; Technical Specification Group Services and System Aspects; System Architecture for the 5G System (5GS); Stage 2 (Release 16) (hereinafter "3GPP TS 23.501 V16.2.0"), it is described that:

5.7.1.1 QoS Flow

The 5G QoS model is based on QoS Flows. The 5G QoS model supports both QoS Flows that require guaranteed flow bit rate (GBR QoS Flows) and QoS Flows that do not require guaranteed flow bit rate (Non-GBR QoS Flows). The 5G QoS model also supports Reflective QoS (see clause 5.7.5).

5.7.2.1 5QI

A 5QI is a scalar that is used as a reference to 5G QoS characteristics defined in clause 5.7.4, i.e. access node-specific parameters that control QoS forwarding treatment for the QoS Flow (e.g. scheduling weights, admission thresholds, queue management thresholds, link layer protocol configuration, etc.). Standardized 5QI values have one-to-one mapping to a standardized combination of 5G QoS characteristics as specified in Table 5.7.4-1.

Table 5.7.4-1, entitled Standardized 5QI to QoS characteristics mapping, is reproduced below:

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 1 | GBR (NOTE 1) | 20 | 100 ms (NOTE 11, NOTE 13) | $10^{-2}$ | N/A | 2000 ms | Conversational Voice |
| 2 | | 40 | 150 ms (NOTE 11, NOTE 13) | $10^{-3}$ | N/A | 2000 ms | Conversational Video (Live Streaming) |
| 3 (NOTE 14) | | 30 | 50 ms (NOTE 11, NOTE 13) | $10^{-3}$ | N/A | 2000 ms | Real Time Gaming, V2X messages Electricity distribution— medium voltage, Process automation— monitoring |
| 4 | | 50 | 300 ms (NOTE 11, NOTE 13) | $10^{-6}$ | N/A | 2000 ms | Non-Conversational Video (Buffered Streaming) |
| 65 (NOTE 9, NOTE 12) | | 7 | 75 ms (NOTE 7, NOTE 8) | $10^{-2}$ | N/A | 2000 ms | Mission Critical user plane Push To Talk voice (e.g., MCPTT) |
| 66 (NOTE 12) | | 20 | 100 ms (NOTE 10, NOTE 13) | $10^{-2}$ | N/A | 2000 ms | Non-Mission-Critical user plane Push To Talk voice |
| 67 (NOTE 12) | | 15 | 100 ms (NOTE 10, NOTE 13) | $10^{-3}$ | N/A | 2000 ms | Mission Critical Video user plane |
| 75 (NOTE 14) | | | | | | | |
| 71 | | 56 | 150 ms (NOTE 11, NOTE 13, NOTE 15) | $10^{-6}$ | N/A | 2000 ms | "Live" Uplink Streaming (e.g. TS 26.238 [76]) |
| 72 | | 56 | 300 ms (NOTE 11, NOTE 13, NOTE 15) | $10^{-4}$ | N/A | 2000 ms | "Live" Uplink Streaming (e.g. TS 26.238 [76]) |
| 73 | | 56 | 300 ms (NOTE 11, NOTE 13, NOTE 15) | $10^{-8}$ | N/A | 2000 ms | "Live" Uplink Streaming (e.g. TS 26.238 [76]) |
| 74 | | 56 | 500 ms (NOTE 11, NOTE 15) | $10^{-8}$ | N/A | 2000 ms | "Live" Uplink Streaming (e.g. TS 26.238 [76]) |

-continued

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 76 | | 56 | 500 ms (NOTE 11, NOTE 13, NOTE 15) | $10^{-4}$ | N/A | 2000 ms | "Live" Uplink Streaming (e.g. TS 26.238 [76]) |
| 5 | Non-GBR (NOTE 1) | 10 | 100 ms (NOTE 10, NOTE 13) | $10^{-6}$ | N/A | N/A | IMS Signalling |
| 6 | | 60 | 300 ms (NOTE 10, NOTE 13) | $10^{-6}$ | N/A | N/A | Video (Buffered Streaming) TCP-based (e.g., www, email, chat, ftp, p2p file sharing, progressive video, etc.) |
| 7 | | 70 | 100 ms (NOTE 10, NOTE 13) | $10^{-3}$ | N/A | N/A | Voice, Video (Live Streaming) Interactive Gaming |
| 8 | | 80 | 300 ms (NOTE 13) | $10^{-6}$ | N/A | N/A | Video (Buffered Streaming) TCP-based (e.g., www, email, chat, ftp, p2p file sharing, progressive video, etc.) |
| 9 | | 90 | | | | | |
| 69 (NOTE 9, NOTE 12) | | 5 | 60 ms (NOTE 7, NOTE 8) | $10^{-6}$ | N/A | N/A | Mission Critical delay sensitive signalling (e.g., MC-PTT signalling) |
| 70 (NOTE 12) | | 55 | 200 ms (NOTE 7, NOTE 10) | $10^{-6}$ | N/A | N/A | Mission Critical Data (e.g. example services are the same as 5QI 6/8/9) |
| 79 | | 65 | 50 ms (NOTE 10, NOTE 13) | $10^{-2}$ | N/A | N/A | V2X messages |
| 80 | | 68 | 10 ms (NOTE 5, NOTE 10) | $10^{-6}$ | N/A | N/A | Low Latency eMBB applications Augmented Reality |
| 82 | Delay Critical GBR | 19 | 10 ms (NOTE 4) | $10^{-4}$ | 255 bytes | 2000 ms | Discrete Automation (see TS 22.261 [2]) |
| 83 | | 22 | 10 ms (NOTE 4) | $10^{-4}$ | 1354 bytes (NOTE 3) | 2000 ms | Discrete Automation (see TS 22.261 [2]) |
| 84 | | 24 | 30 ms (NOTE 6) | $10^{-5}$ | 1354 bytes (NOTE 3) | 2000 ms | Intelligent transport systems (see TS 22.261 [2]) |

-continued

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 85 | | 21 | 5 ms (NOTE 5) | $10^{-5}$ | 255 bytes | 2000 ms | Electricity Distribution-high voltage (see TS 22.261 [2]) |

NOTE 1:
A packet which is delayed more than PDB is not counted as lost, thus not included in the PER.
NOTE 2:
It is required that default MDBV is supported by a PLMN supporting the related 5QIs.
NOTE 3:
This MDBV value is set to 1354 bytes to avoid IP fragmentation for the IPv6 based, IPSec protected GTP tunnel to the 5G-AN node (the value is calculated as in Annex C of TS 23.060 [56] and further reduced by 4 bytes to allow for the usage of a GTP-U extension header).
NOTE 4:
A static value for the CN PDB of 1 ms for the delay between a UPF terminating N6 and a 5G-AN should be subtracted from a given PDB to derive the packet delay budget that applies to the radio interface. When a dynamic CN PDB is used, see clause 5.7.3.4.
NOTE 5:
A static value for the CN PDB of 2 ms for the delay between a UPF terminating N6 and a 5G-AN should be subtracted from a given PDB to derive the packet delay budget that applies to the radio interface. When a dynamic CN PDB is used, see clause 5.7.3.4.
NOTE 6:
A static value for the CN PDB of 5 ms for the delay between a UPF terminating N6 and a 5G-AN should be subtracted from a given PDB to derive the packet delay budget that applies to the radio interface. When a dynamic CN PDB is used, see clause 5.7.3.4.
NOTE 7:
For Mission Critical services, it may be assumed that the UPF terminating N6 is located "close" to the 5G_AN (roughly 10 ms) and is not normally used in a long distance, home routed roaming situation. Hence a static value for the CN PDB of 10 ms for the delay between a UPF terminating N6 and a 5G_AN should be subtracted from this PDB to derive the packet delay budget that applies to the radio interface.
NOTE 8:
In both RRC Idle and RRC Connected mode, the PDB requirement for these 5QIs can be relaxed (but not to a value greater than 320 ms) for the first packet(s) in a downlink data or signalling burst in order to permit reasonable battery saving (DRX) techniques.
NOTE 9:
It is expected that 5QI-65 and 5QI-69 are used together to provide Mission Critical Push to Talk service (e.g., 5QI-5 is not used for signalling). It is expected that the amount of traffic per UE will be similar or less compared to the IMS signalling.
NOTE 10:
In both RRC Idle and RRC Connected mode, the PDB requirement for these 5QIs can be relaxed for the first packet(s) in a downlink data or signalling burst in order to permit battery saving (DRX) techniques.
NOTE 11:
In RRC Idle mode, the PDB requirement for these 5QIs can be relaxed for the first packet(s) in a downlink data or signalling burst in order to permit battery saving (DRX) techniques.
NOTE 12:
This 5 QI value can only be assigned upon request from the network side. The UE and any application running on the UE is not allowed to request this 5QI value.
NOTE 13:
A static value for the CN PDB of 20 ms for the delay between a UPF terminating N6 and a 5G-AN should be subtracted from a given PDB to derive the packet delay budget that applies to the radio interface.
NOTE 14:
This 5QI is not supported in this Release of the specification as it is only used for transmission of V2X messages over MBMS bearers as defined in TS 23.285 [72] but the value is reserved for future use.
NOTE 15:
For "live" uplink streaming (see TS 26.238 [76]), guidelines for PDB values of the different 5QIs correspond to the latency configurations defined in TR 26.939 [77]. In order to support higher latency reliable streaming services (above 500 ms PDB), if different PDB and PER combinations are needed these configurations will have to use non-standardised 5QIs.

As described in connection with Table 5.7.4-1, it is preferred that a value less than 64 is allocated for any new standardised 5QI of non-GBR Resource Type. This is to allow for option 1 to be used as described in clause 5.7.1.3 (as the QFI is limited to less than 64). More information about QoS is given in Section 5.7 of 3GPP TS 23.501 V16.2.0.

There currently exist certain challenges. For example, 5G NR supports more stringent QoS requirement categories than LTE. Although the 5G NR specification allows great flexibly in configuring the TDD_UL/DL patterns, in practice only a limited number of TDD patterns can be supported, especially when 5G NR must co-exist with the 4G LTE system in the same frequency band. This is because the TDD pattern needs to be synchronized and agreed among different network operators in order to avoid cross-link interference (e.g., DL to UL interference). Additionally, in some networks the TDD pattern also needs to be synchronized with the LTE network. As a result, the number of TDD patterns supported in practice are limited. These practical restrictions cause great latency in scheduling the UL packages and, in some cases, the latency is too large to fulfill the QoS requirement. In such a case, certain services cannot be deployed in the NR system.

SUMMARY

To address the foregoing problems with existing solutions, disclosed is a method performed by a network node. The method comprises determining, based on one or more quality-of-service (QoS) parameters, an aggregated uplink (UL) scheduling pattern for a wireless device, the aggregated UL scheduling pattern for the wireless device comprising UL resources from a plurality of carriers, wherein: the one or more QoS parameters indicate one or more QoS requirements associated with a service; and at least one of the one or more QoS parameters indicates a delay requirement associated with the service.

In certain embodiments, the method may comprise configuring the wireless device with the aggregated UL scheduling pattern. In certain embodiments, configuring the wireless device with the aggregated UL scheduling pattern may comprise configuring the wireless device with one or more subpatterns of the aggregated UL scheduling pattern, wherein each of the one or more subpatterns corresponds to one of the plurality of carriers. In certain embodiments, the network node may configure the wireless device with the determined aggregated UL scheduling pattern using at least one configured grant (CG) for one or more Physical Uplink Shared Channel (PUSCH) transmissions. In certain embodiments, the network node may configure the wireless device with the determined aggregated UL scheduling pattern using at least one dynamic grant and the at least one CG for one or more PUSCH transmissions. In certain embodiments, the at least one CG may comprise one of: a configured grant type 1, wherein radio resource control (RRC) signaling is used to provide an uplink grant, including activation of the grant; and a configured grant type 2, wherein RRC signaling provides a transmission periodicity, and L1/L2 control signaling is used to activate and deactivate the transmission.

In certain embodiments, configuring the wireless device with the aggregated UL scheduling pattern may comprise dynamically scheduling the wireless device to transmit in accordance with the aggregated UL scheduling pattern. In certain embodiments, the dynamic scheduling may use at least one dynamic grant.

In certain embodiments, the at least one dynamic grant may be carried by downlink control information (DCI). In certain embodiments, the at least one dynamic grant may be carried by Physical Downlink Control Channel (PDCCH).

In certain embodiments, determining the aggregated UL scheduling pattern for the wireless device may comprise determining one or more of: a configured grant usage for each of the plurality of carriers; a set of time domain hypotheses to fulfill a packet delay budget (PDB) of the service; a configured time domain resource; a configured grant periodicity; and a set of configured grant parameters. In certain embodiments, the network node may configure the wireless device with the determined aggregated UL scheduling pattern using at least one CG for one or more PUSCH transmissions, and the at least one CG may comprise one or more of: the configured time domain resource; the configured grant periodicity; and the set of configured grant parameters.

In certain embodiments, the aggregated UL scheduling pattern for the wireless device may be determined based on a respective time division duplex (TDD) pattern for at least one carrier configured for the wireless device.

In certain embodiments, the aggregated UL scheduling pattern for the wireless device may be determined based on available UL resources of one or more carriers configured for the wireless device. In certain embodiments, determining the aggregated UL scheduling pattern for the wireless device may comprise: determining the available UL resources of the one or more carriers configured for the wireless device; and selecting one or more UL resources from the one or more carriers configured for the wireless device that fulfill the one or more QoS requirements associated with the service. In certain embodiments, the plurality of carriers may be a subset of the one or more carriers configured for the wireless device.

In certain embodiments, the method may comprise obtaining the one or more QoS parameters. In certain embodiments, the aggregated UL scheduling pattern may fulfill the one or more QoS requirements associated with the service. In certain embodiments, the one or more QoS parameters may include a 5QI parameter. In certain embodiments, the at least one of the one or more QoS parameters may be a packet delay budget (PDB) of the service. In certain embodiments, the method may comprise determining a scheduling transmission instance that fulfills the PDB of the service. The aggregated UL scheduling pattern may be determined based on the scheduling transmission instance.

In certain embodiments, the aggregated UL scheduling pattern may fulfill the delay requirement of the service.

In certain embodiments, the plurality of carriers may comprise at least one time division duplex (TDD) carrier and at least one frequency division duplex (FDD) carrier. In certain embodiments, the plurality of carriers may comprise a TDD mid band and an FDD low band. In certain embodiments, the plurality of carriers may comprise a TDD high band and an FDD low band.

In certain embodiments, the plurality of carriers may comprise a plurality of time division duplex (TDD) carriers. In certain embodiments, the plurality of carriers may comprise: a TDD high band; and one or more of: an unsynchronized TDD high band; and an unsynchronized TDD mid band.

In certain embodiments, the plurality of carriers may comprise a plurality of frequency division duplex (FDD) carriers.

In certain embodiments, the aggregated UL scheduling pattern may comprise UL resources from a licensed band. In certain embodiments, the aggregated UL scheduling pattern may comprise UL resources from an unlicensed band. In certain embodiments, the aggregated UL scheduling pattern may comprise UL resources from a supplementary uplink (SUL) carrier.

In certain embodiments, the method may comprise scheduling the wireless device with additional UL resources using a dynamic grant together with the aggregated UL scheduling pattern based on the QoS parameters.

In certain embodiments, the aggregated UL scheduling pattern for the wireless device comprises UL resources from a plurality of bandwidth parts.

Also disclosed is a computer program, the computer program comprising instructions configured to perform the above-described method performed by a network node.

Also disclosed is a computer program product, the computer program product comprising a non-transitory computer-readable storage medium, the non-transitory computer-readable storage medium comprising a computer program comprising computer-executable instructions which, when executed on a processor, are configured to perform the above-described method performed by a network node.

Also disclosed is a network node. The network node comprises a receiver, a transmitter, and processing circuitry coupled to the receiver and the transmitter. The processing circuitry is configured to determine, based on one or more QoS parameters, an aggregated UL scheduling pattern for a wireless device, the aggregated UL scheduling pattern for the wireless device comprising UL resources from a plurality of carriers, wherein: the one or more QoS parameters indicate one or more QoS requirements associated with a service; and at least one of the one or more QoS parameters indicates a delay requirement associated with the service.

Also disclosed is a method performed by a wireless device for UL transmission. The method comprises obtaining a configuration for an aggregated UL scheduling pattern, the aggregated UL scheduling pattern comprising UL resources from a plurality of carriers. The method comprises determining one or more of the UL resources from the aggregated UL scheduling pattern based on one or more QoS parameters, wherein: the one or more QoS parameters indicate one or more QoS requirements associated with a service; and at least one of the one or more QoS parameters indicates a delay requirement associated with the service. The method comprises performing UL transmission using the one or more determined UL resources.

In certain embodiments, the wireless device may obtain the configuration for the aggregated UL scheduling pattern based on at least one CG for one or more PUSCH transmissions. In certain embodiments, the wireless device may obtain the configuration for the aggregated UL scheduling pattern based on at least one dynamic grant and the at least one CG for one or more PUSCH transmissions. In certain embodiments, the at least one CG may comprise one of: a configured grant type 1, wherein RRC signaling is used to provide an uplink grant, including activation of the grant; and a configured grant type 2, wherein RRC signaling provides a transmission periodicity, and L1/L2 control signaling is used to activate and deactivate the transmission. In certain embodiments, the at least one CG may comprise one or more of: a configured time domain resource; a configured grant periodicity; and a set of configured grant parameters.

In certain embodiments, obtaining the configuration for the aggregated UL scheduling pattern may comprise being dynamically scheduled to transmit in accordance with the aggregated UL scheduling pattern. In certain embodiments, being dynamically scheduled to transmit in accordance with the aggregated UL scheduling pattern may comprise receiving at least one dynamic grant. In certain embodiments, the at least one dynamic grant may be carried by DCI. In certain embodiments, the at least one dynamic grant may be carried by PDCCH.

In certain embodiments, the aggregated UL scheduling pattern for the wireless device may be determined based on a respective TDD pattern for at least one carrier configured for the wireless device.

In certain embodiments, the aggregated UL scheduling pattern for the wireless device may be based on available UL resources of one or more carriers configured for the wireless device. In certain embodiments, the plurality of carriers may be a subset of the one or more carriers configured for the wireless device.

In certain embodiments, the aggregated UL scheduling pattern may fulfill the delay requirement of the service.

In certain embodiments, the plurality of carriers may comprise at least one TDD carrier and at least one FDD carrier. In certain embodiments, the plurality of carriers may comprise a TDD mid band and an FDD low band. In certain embodiments, the plurality of carriers may comprise a TDD high band and an FDD low band.

In certain embodiments, the plurality of carriers may comprise a plurality of TDD carriers. In certain embodiments, the plurality of carriers may comprise: a TDD high band; and one or more of: an unsynchronized TDD high band; and an unsynchronized TDD mid band.

In certain embodiments, the plurality of carriers may comprise a plurality of FDD carriers.

In certain embodiments, the one or more QoS parameters may include a 5QI parameter. In certain embodiments, the at least one of the one or more QoS parameters may be a PDB of the service.

In certain embodiments, the aggregated UL scheduling pattern may comprise UL resources from a licensed band. In certain embodiments, the aggregated UL scheduling pattern may comprise UL resources from an unlicensed band. In certain embodiments, the aggregated UL scheduling pattern may comprise UL resources from a SUL carrier. In certain embodiments, the aggregated UL scheduling pattern may comprise UL resources from a plurality of bandwidth parts.

Also disclosed is a computer program, the computer program comprising instructions configured to perform the above-described method performed by a wireless device.

Also disclosed is a computer program product, the computer program product comprising a non-transitory computer-readable medium, the non-transitory computer-readable storage medium comprising a computer program comprising computer-executable instructions which, when executed on a processor, are configured to perform the above-described method performed by a wireless device.

Also disclosed is a wireless device. The wireless device comprises a receiver; a transmitter; and processing circuitry coupled to the receiver and the transmitter. The processing circuitry is configured to obtain a configuration for an aggregated UL scheduling pattern, the aggregated UL scheduling pattern comprising UL resources from a plurality of carriers. The processing circuitry is configured to determine one or more of the UL resources from the aggregated UL scheduling pattern based on one or more QoS parameters, wherein: the one or more QoS parameters indicate one or more QoS requirements associated with a service; and at least one of the one or more QoS parameters indicates a delay requirement associated with the service. The processing circuitry is configured to perform UL transmission using the one or more determined UL resources.

Certain embodiments of the present disclosure may provide one or more technical advantages. As one example, certain embodiments may greatly reduce latency in UL transmission in NR TDD deployment, which advantageously makes it possible to enable services with stringent latency requirements. As another example, certain embodiments can be applied to a hybrid NR deployment employing both TDD and FDD carriers. As still another example, certain embodiments can be applied to an NR FDD deployment utilizing multiple NR FDD carriers. In some cases, the latency on an FDD carrier may be constrained due to traffic load that makes it problematic to configure UL CG PUSCH (also referred to herein as CG for one or more PUSCH transmissions) with desired periodicity on a single FDD carrier for a new UE. In certain embodiments, the proposed pair spectrum approaches described herein may advantageously mitigate such a problem by pooling resources from multiple carriers. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
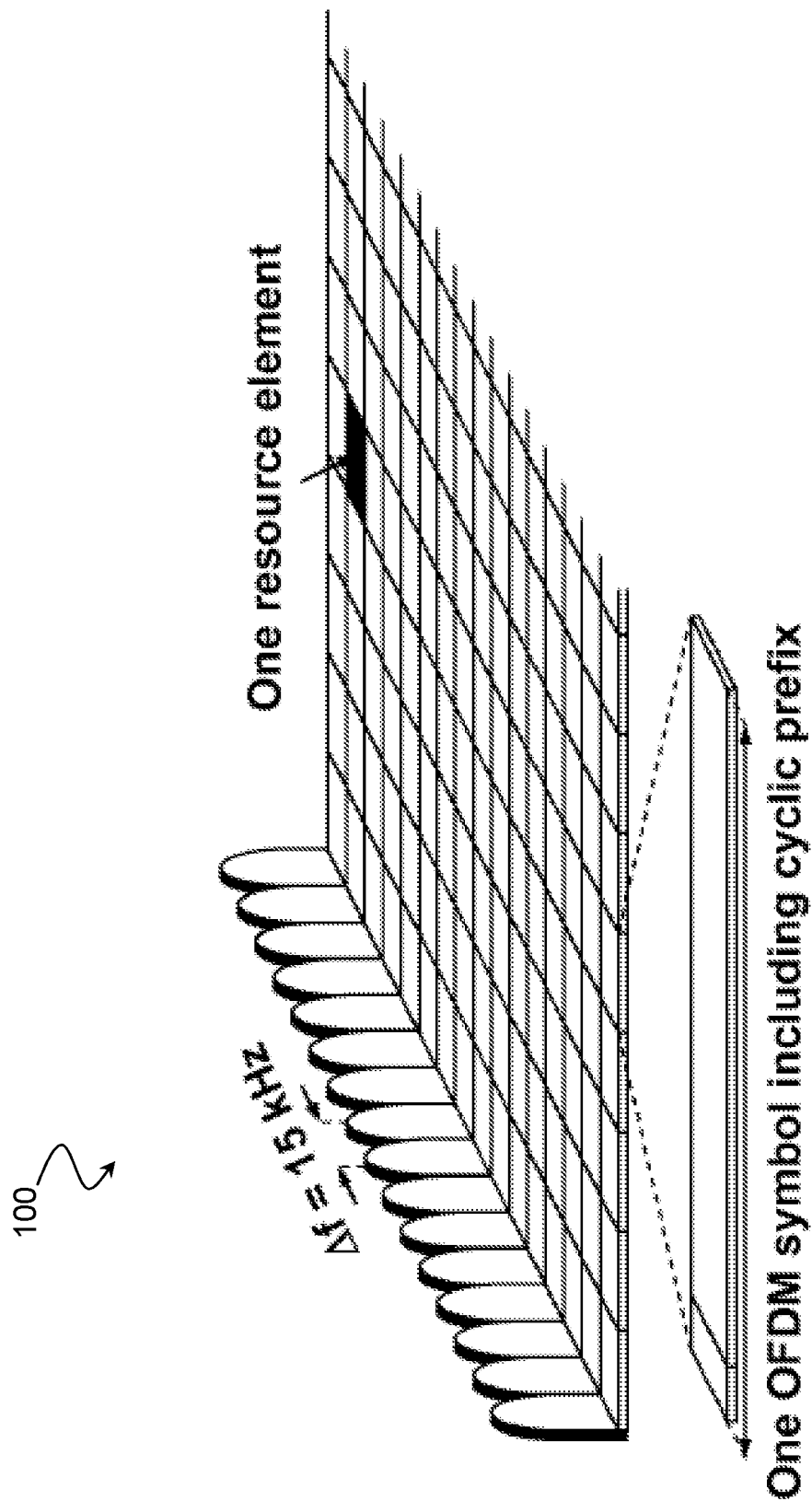
FIG. 1 illustrates an exemplary radio resource in NR.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As described above, 5G NR supports more stringent QoS requirement categories. Although the 5G NR specification allows great flexibly in configuring the TDD_UL/DL patterns, in practice only a limited number of TDD patterns can be supported. This is especially true when 5G NR must co-exist with the 4G LTE system in the same frequency band. These practical restrictions cause great latency in scheduling the UL packages and, in some cases, the latency is too large to fulfill the QoS requirement. In such a case, certain services cannot be deployed in the NR system.

Certain aspects of the present disclosure and the embodiments described herein may provide solutions to these or other challenges. For example, certain embodiments of the present disclosure utilize the pair spectrum solution together with UL configured grant (CG) PUSCH (also referred to as semi-persistent scheduling, UL without PDCCH, grant-free UL, pre-configured UL resource in various literatures) transmissions to provide UE UL resources in different carriers to meet the latency requirement of certain services.

According to one example embodiment, a method performed by a network node (e.g., a gNB) is disclosed. The network node determines, based on one or more QoS parameters, an aggregated UL scheduling pattern for a wireless device (e.g., a UE). The aggregated UL scheduling pattern for the wireless device comprises UL resources from a plurality of carriers. The one or more QoS parameters (e.g., a 5QI parameter) indicate one or more QoS requirements associated with a service. At least one of the one or more QoS parameters indicates a delay requirement associated with the service (e.g., a packet delay budget (PDB) of the service). The service may for example be one of the services listed in the Table 5.7.4-1, entitled Standardized 5QI to QoS characteristics mapping, which is reproduced above in the background section. The service may for example be one of the delay critical services corresponding to the 5QI values 82-85 in that table.

As described in more detail herein, the network node may determine the aggregated UL scheduling pattern in a variety of ways. For example, the network node may determine the aggregated UL scheduling pattern for the wireless device based on a respective TDD pattern for at least one carrier configured for the wireless device (for example based on a respective TDD pattern for each of a plurality of carriers configured for the wireless device). As another example, the network node may determine the aggregated UL scheduling pattern for the wireless device based on available UL resources of one or more carriers configured for the wireless device.

In certain embodiments, the network node may configure the wireless device with the aggregated UL scheduling pattern. For example, the network node may configure the wireless device with the determined aggregated UL scheduling pattern using at least one CG for one or more PUSCH transmissions. As another example, the network node may configure the wireless device with the determined aggregated UL scheduling pattern using at least one dynamic grant and at least one CG for one or more PUSCH transmissions. As still another example, the network node may configure the wireless device with the aggregated UL scheduling pattern by dynamically scheduling the wireless device to transmit in accordance with the aggregated UL scheduling pattern (e.g., using at least one dynamic grant). In certain embodiments, the network node may configure the wireless device with one or more subpatterns of the aggregated UL scheduling pattern. Each of the one or more subpatterns may correspond to one of the plurality of carriers. The aggregated UL scheduling pattern may for example comprise (or consist of) respective subpatterns in the respective carriers, and the wireless device may for example be configured with the aggregated UL scheduling pattern by being configured with the respective subpatterns for the respective carriers. The individual subpatterns may for example not fulfill the one or more QoS requirements associated with the service. The aggregated UL scheduling pattern may advantageously fulfill the one or more QoS requirements associated with the service.

According to other example embodiments described herein, a corresponding network node, computer program, and computer program product are also disclosed.

In some implementations, the aggregated UL scheduling pattern determined by the network node may be used by the wireless device to select UL resources to use for performing UL transmission in a way that satisfies the applicable latency requirements of a service. For example, according to another example embodiment, a method performed by a wireless device for UL transmission is disclosed. The wireless device obtains a configuration for an aggregated UL scheduling pattern, the aggregated UL scheduling pattern comprising UL resources from a plurality of carriers. The wireless device determines one or more of the UL resources from the aggregated UL scheduling pattern based on one or more QoS parameters. The one or more QoS parameters (e.g., a 5QI parameter) indicate one or more QoS requirements associated with a service. At least one of the one or more QoS parameters indicates a delay requirement associated with the service (e.g., a PDB of the service). The wireless device performs UL transmission using the one or more determined UL resources.

As described in more detail herein, the wireless device may obtain the configuration for the aggregated UL scheduling pattern in a variety of ways. For example, the wireless device may obtain the configuration for the aggregated UL scheduling pattern based on at least one CG for one or more PUSCH transmissions. In other words, the wireless device may obtain at least a portion of the configuration for the aggregated UL scheduling pattern from at least one CG for one or more PUSCH transmissions. Other portion(s) of the configuration for the aggregated UL scheduling pattern may optionally be obtained from other sources or by other means. As another example, the wireless device may obtain the configuration for the aggregated UL scheduling pattern based on at least one dynamic grant and the at least one CG for one or more PUSCH transmissions. In other words, the wireless device may obtain a portion of the configuration for the aggregated UL scheduling pattern from at least one dynamic grant and another portion of the configuration for the aggregated UL scheduling pattern from the at least one CG for one or more PUSCH transmissions. Other portion(s) of the configuration for the aggregated UL scheduling pattern may optionally be obtained from other sources or by other means. As still another example, the wireless device may obtain the configuration for the aggregated UL scheduling pattern by being dynamically scheduled to transmit in accordance with the aggregated UL scheduling pattern (e.g., by receiving at least one dynamic grant).

According to other example embodiments, a corresponding wireless device, computer program, and computer program product are also disclosed.

Certain embodiments may provide one or more of the following technical advantages. As one example, certain embodiments may greatly reduce latency in UL transmission in NR TDD deployment, which advantageously makes it possible to enable services with stringent latency requirement. As another example, certain embodiments can be applied to a hybrid NR deployment employing both TDD and FDD carriers. As still another example, certain embodiments can be applied to an NR FDD deployment utilizing multiple NR FDD carriers. In some cases, the latency on an FDD carrier may be constrained due to traffic load that makes it problematic to configure UL CG PUSCH with desired periodicity on a single FDD carrier for a new UE. In certain embodiments, the proposed pair spectrum approaches described herein may advantageously mitigate such a problem by pooling resources from multiple carriers. Other advantages may be readily apparent to one having skill in the art. Certain embodiments may have none, some, or all of the recited advantages.

Some of the embodiments contemplated herein will now be described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Figure 2:
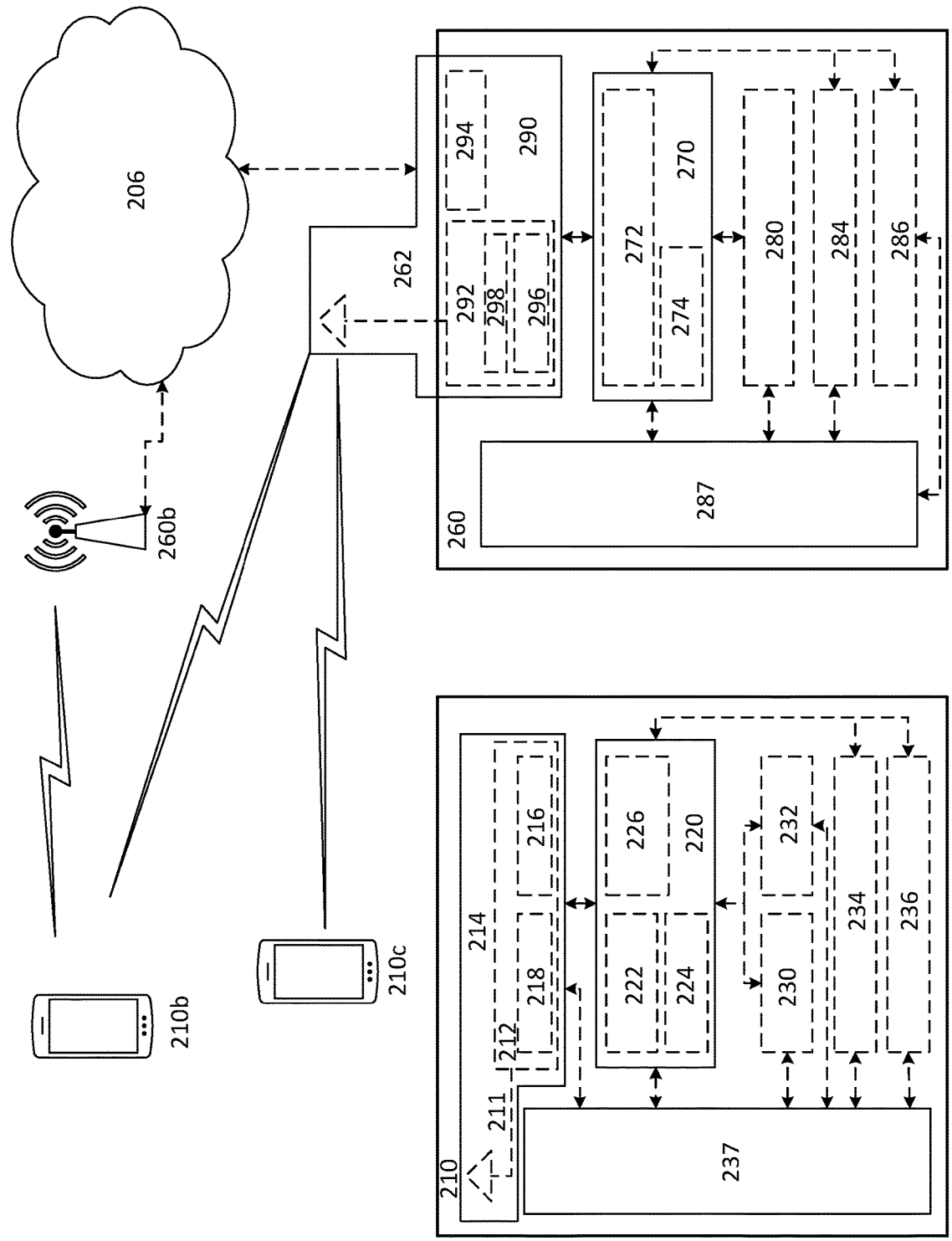
FIG. 2 illustrates an example wireless network, in accordance with certain embodiments.

FIG. 2 illustrates an example wireless network, in accordance with certain embodiments. Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 206, network nodes 260 and 260b and wireless devices 210, 210b and 210c. In practice, a wireless network may further include any additional elements suitable to support communication between wireless devices or between a wireless device and another communication device, such as a landline telephone, a service provider, or any other network node or end device. Of the illustrated components, network node 260 and wireless device 210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as NR, Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 206 may comprise one or more backhaul networks, core networks, Internet Protocol (IP) networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 260 and wireless device 210 comprise various components described in more detail below. Although the example embodiment of FIG. 2 illustrates network node 260 and wireless device 210 as having a number of components, it should be understood that not every illustrated component is required. In certain implementations, the various embodiments described herein may be implemented in network nodes and/or wireless devices having fewer than all components illustrated in the example embodiment of FIG. 2. In the example embodiment of FIG. 2, the various components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., mobile switching centres (MSCs), mobility management entities (MMEs)), operation and maintenance (O&M) nodes, operations support system (OSS) nodes, self-optimized network (SON) nodes, positioning nodes (e.g., evolved Serving Mobile Location Centers (E-SMLCs)), and/or minimization of drive tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, network node 260 includes processing circuitry 270, device readable medium 280, interface 290, auxiliary equipment 284, power source 286, power circuitry 287, and antenna 262. Although network node 260 illustrated in the example wireless network of FIG. 2 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 260 are depicted as single boxes located within a larger box, or nested within multiple boxes, in practice, a network node may comprise multiple different physical components that make up a single illustrated component (e.g., device readable medium 280 may comprise multiple separate hard drives as well as multiple RAM modules).

Similarly, network node 260 may be composed of multiple physically separate components (e.g., a NodeB component and a RNC component, or a BTS component and a BSC component, etc.), which may each have their own respective components. In certain scenarios in which network node 260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 260 may be configured to support multiple radio access technologies (RATs). In such embodiments, some components may be duplicated (e.g., separate device readable medium 280 for the different RATs) and some components may be reused (e.g., the same antenna 262 may be shared by the RATs). Network node 260 may also include multiple sets of the various illustrated components for different wireless technologies integrated into network node 260, such as, for example, GSM, WCDMA, LTE, NR, WiFi, or Bluetooth wireless technologies. These wireless technologies may be integrated into the same or different chip or set of chips and other components within network node 260.

Processing circuitry 270 is configured to perform any determining, calculating, or similar operations (e.g., certain obtaining operations) described herein as being provided by a network node. These operations performed by processing circuitry 270 may include processing information obtained by processing circuitry 270 by, for example, converting the obtained information into other information, comparing the obtained information or converted information to information stored in the network node, and/or performing one or more operations based on the obtained information or converted information, and as a result of said processing making a determination.

Processing circuitry 270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 260 components, such as device readable medium 280, network node 260 functionality. For example, processing circuitry 270 may execute instructions stored in device readable medium 280 or in memory within processing circuitry 270. Such functionality may include providing any of the various wireless features, functions, or benefits discussed herein. In some embodiments, processing circuitry 270 may include a system on a chip (SOC).

In some embodiments, processing circuitry 270 may include one or more of radio frequency (RF) transceiver circuitry 272 and baseband processing circuitry 274. In some embodiments, RF transceiver circuitry 272 and baseband processing circuitry 274 may be on separate chips (or sets of chips), boards, or units, such as radio units and digital units. In alternative embodiments, part or all of RF transceiver circuitry 272 and baseband processing circuitry 274 may be on the same chip or set of chips, boards, or units In certain embodiments, some or all of the functionality described herein as being provided by a network node, base station, eNB or other such network device may be performed by processing circuitry 270 executing instructions stored on device readable medium 280 or memory within processing circuitry 270. In alternative embodiments, some or all of the functionality may be provided by processing circuitry 270 without executing instructions stored on a separate or discrete device readable medium, such as in a hard-wired manner. In any of those embodiments, whether executing instructions stored on a device readable storage medium or not, processing circuitry 270 can be configured to perform the described functionality. The benefits provided by such functionality are not limited to processing circuitry 270 alone or to other components of network node 260, but are enjoyed by network node 260 as a whole, and/or by end users and the wireless network generally.

Device readable medium 280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 270. Device readable medium 280 may store any suitable instructions, data or information, including a computer program, software, an application including one or more of logic, rules, code, tables, etc. and/or other instructions capable of being executed by processing circuitry 270 and, utilized by network node 260. Device readable medium 280 may be used to store any calculations made by processing circuitry 270 and/or any data received via interface 290. In some embodiments, processing circuitry 270 and device readable medium 280 may be considered to be integrated.

Interface 290 is used in the wired or wireless communication of signalling and/or data between network node 260, network 206, and/or wireless devices 210. As illustrated, interface 290 comprises port(s)/terminal(s) 294 to send and receive data, for example to and from network 206 over a wired connection. Interface 290 also includes radio front end circuitry 292 that may be coupled to, or in certain embodiments a part of, antenna 262. Radio front end circuitry 292 comprises filters 298 and amplifiers 296. Radio front end circuitry 292 may be connected to antenna 262 and processing circuitry 270. Radio front end circuitry may be configured to condition signals communicated between antenna 262 and processing circuitry 270. Radio front end circuitry 292 may receive digital data that is to be sent out to other network nodes or wireless devices via a wireless connection. Radio front end circuitry 292 may convert the digital data into a radio signal having the appropriate channel and bandwidth parameters using a combination of filters 298 and/or amplifiers 296. The radio signal may then be transmitted via antenna 262. Similarly, when receiving data, antenna 262 may collect radio signals which are then converted into digital data by radio front end circuitry 292. The digital data may be passed to processing circuitry 270. In other embodiments, the interface may comprise different components and/or different combinations of components.

In certain alternative embodiments, network node 260 may not include separate radio front end circuitry 292, instead, processing circuitry 270 may comprise radio front end circuitry and may be connected to antenna 262 without separate radio front end circuitry 292. Similarly, in some embodiments, all or some of RF transceiver circuitry 272 may be considered a part of interface 290. In still other embodiments, interface 290 may include one or more ports or terminals 294, radio front end circuitry 292, and RF transceiver circuitry 272, as part of a radio unit (not shown), and interface 290 may communicate with baseband processing circuitry 274, which is part of a digital unit (not shown).

Antenna 262 may include one or more antennas, or antenna arrays, configured to send and/or receive wireless signals. Antenna 262 may be coupled to radio front end circuitry 290 and may be any type of antenna capable of transmitting and receiving data and/or signals wirelessly. In some embodiments, antenna 262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 262 may be separate from network node 260 and may be connectable to network node 260 through an interface or port.

Antenna 262, interface 290, and/or processing circuitry 270 may be configured to perform any receiving operations and/or certain obtaining operations described herein as being performed by a network node. Any information, data and/or signals may be received from a wireless device, another network node and/or any other network equipment. Similarly, antenna 262, interface 290, and/or processing circuitry 270 may be configured to perform any transmitting operations described herein as being performed by a network node. Any information, data and/or signals may be transmitted to a wireless device, another network node and/or any other network equipment.

Power circuitry 287 may comprise, or be coupled to, power management circuitry and is configured to supply the components of network node 260 with power for performing the functionality described herein. Power circuitry 287 may receive power from power source 286. Power source 286 and/or power circuitry 287 may be configured to provide power to the various components of network node 260 in a form suitable for the respective components (e.g., at a voltage and current level needed for each respective component). Power source 286 may either be included in, or external to, power circuitry 287 and/or network node 260. For example, network node 260 may be connectable to an external power source (e.g., an electricity outlet) via an input circuitry or interface such as an electrical cable, whereby the external power source supplies power to power circuitry 287. As a further example, power source 286 may comprise a source of power in the form of a battery or battery pack which is connected to, or integrated in, power circuitry 287. The battery may provide backup power should the external power source fail. Other types of power sources, such as photovoltaic devices, may also be used.

Alternative embodiments of network node 260 may include additional components beyond those shown in FIG. 2 that may be responsible for providing certain aspects of the network node's functionality, including any of the functionality described herein and/or any functionality necessary to support the subject matter described herein. For example, network node 260 may include user interface equipment to allow input of information into network node 260 and to allow output of information from network node 260. This may allow a user to perform diagnostic, maintenance, repair, and other administrative functions for network node 260.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 210 includes antenna 211, interface 214, processing circuitry 220, device readable medium 230, user interface equipment 232, auxiliary equipment 234, power source 236 and power circuitry 237. Wireless device 210 may include multiple sets of one or more of the illustrated components for different wireless technologies supported by wireless device 210, such as, for example, GSM, WCDMA, LTE, NR, WiFi, WiMAX, or Bluetooth wireless technologies, just to mention a few. These wireless technologies may be integrated into the same or different chips or set of chips as other components within wireless device 210.

Antenna 211 may include one or more antennas or antenna arrays, configured to send and/or receive wireless signals, and is connected to interface 214. In certain alternative embodiments, antenna 211 may be separate from wireless device 210 and be connectable to wireless device 210 through an interface or port. Antenna 211, interface 214, and/or processing circuitry 220 may be configured to perform any receiving or transmitting operations described herein as being performed by a wireless device. Any information, data and/or signals may be received from a network node and/or another wireless device. In some embodiments, radio front end circuitry and/or antenna 211 may be considered an interface.

As illustrated, interface 214 comprises radio front end circuitry 212 and antenna 211. Radio front end circuitry 212 comprise one or more filters 218 and amplifiers 216. Radio front end circuitry 214 is connected to antenna 211 and processing circuitry 220, and is configured to condition signals communicated between antenna 211 and processing circuitry 220. Radio front end circuitry 212 may be coupled to or a part of antenna 211. In some embodiments, wireless device 210 may not include separate radio front end circuitry 212; rather, processing circuitry 220 may comprise radio front end circuitry and may be connected to antenna 211. Similarly, in some embodiments, some or all of RF transceiver circuitry 222 may be considered a part of interface 214. Radio front end circuitry 212 may receive digital data that is to be sent out to other network nodes or wireless devices via a wireless connection. Radio front end circuitry 212 may convert the digital data into a radio signal having the appropriate channel and bandwidth parameters using a combination of filters 218 and/or amplifiers 216. The radio signal may then be transmitted via antenna 211. Similarly, when receiving data, antenna 211 may collect radio signals which are then converted into digital data by radio front end circuitry 212. The digital data may be passed to processing circuitry 220. In other embodiments, the interface may comprise different components and/or different combinations of components.

Processing circuitry 220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 210 components, such as device readable medium 230, wireless device 210 functionality. Such functionality may include providing any of the various wireless features or benefits discussed herein. For example, processing circuitry 220 may execute instructions stored in device readable medium 230 or in memory within processing circuitry 220 to provide the functionality disclosed herein.

As illustrated, processing circuitry 220 includes one or more of RF transceiver circuitry 222, baseband processing circuitry 224, and application processing circuitry 226. In other embodiments, the processing circuitry may comprise different components and/or different combinations of components. In certain embodiments processing circuitry 220 of wireless device 210 may comprise a SOC. In some embodiments, RF transceiver circuitry 222, baseband processing circuitry 224, and application processing circuitry 226 may be on separate chips or sets of chips. In alternative embodiments, part or all of baseband processing circuitry 224 and application processing circuitry 226 may be combined into one chip or set of chips, and RF transceiver circuitry 222 may be on a separate chip or set of chips. In still alternative embodiments, part or all of RF transceiver circuitry 222 and baseband processing circuitry 224 may be on the same chip or set of chips, and application processing circuitry 226 may be on a separate chip or set of chips. In yet other alternative embodiments, part or all of RF transceiver circuitry 222, baseband processing circuitry 224, and application processing circuitry 226 may be combined in the same chip or set of chips. In some embodiments, RF transceiver circuitry 222 may be a part of interface 214. RF transceiver circuitry 222 may condition RF signals for processing circuitry 220.

In certain embodiments, some or all of the functionality described herein as being performed by a wireless device may be provided by processing circuitry 220 executing instructions stored on device readable medium 230, which in certain embodiments may be a computer-readable storage medium. In alternative embodiments, some or all of the functionality may be provided by processing circuitry 220 without executing instructions stored on a separate or discrete device readable storage medium, such as in a hard-wired manner. In any of those particular embodiments, whether executing instructions stored on a device readable storage medium or not, processing circuitry 220 can be configured to perform the described functionality. The benefits provided by such functionality are not limited to processing circuitry 220 alone or to other components of wireless device 210, but are enjoyed by wireless device 210 as a whole, and/or by end users and the wireless network generally.

Processing circuitry 220 may be configured to perform any determining, calculating, or similar operations (e.g., certain obtaining operations) described herein as being performed by a wireless device. These operations, as performed by processing circuitry 220, may include processing information obtained by processing circuitry 220 by, for example, converting the obtained information into other information, comparing the obtained information or converted information to information stored by wireless device 210, and/or performing one or more operations based on the obtained information or converted information, and as a result of said processing making a determination.

Device readable medium 230 may be operable to store a computer program, software, an application including one or more of logic, rules, code, tables, etc. and/or other instructions capable of being executed by processing circuitry 220. Device readable medium 230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 220. In some embodiments, processing circuitry 220 and device readable medium 230 may be considered to be integrated.

User interface equipment 232 may provide components that allow for a human user to interact with wireless device 210. Such interaction may be of many forms, such as visual, audial, tactile, etc. User interface equipment 232 may be operable to produce output to the user and to allow the user to provide input to wireless device 210. The type of interaction may vary depending on the type of user interface equipment 232 installed in wireless device 210. For example, if wireless device 210 is a smart phone, the interaction may be via a touch screen; if wireless device 210 is a smart meter, the interaction may be through a screen that provides usage (e.g., the number of gallons used) or a speaker that provides an audible alert (e.g., if smoke is detected). User interface equipment 232 may include input interfaces, devices and circuits, and output interfaces, devices and circuits. User interface equipment 232 is configured to allow input of information into wireless device 210, and is connected to processing circuitry 220 to allow processing circuitry 220 to process the input information. User interface equipment 232 may include, for example, a microphone, a proximity or other sensor, keys/buttons, a touch display, one or more cameras, a USB port, or other input circuitry. User interface equipment 232 is also configured to allow output of information from wireless device 210, and to allow processing circuitry 220 to output information from wireless device 210. User interface equipment 232 may include, for example, a speaker, a display, vibrating circuitry, a USB port, a headphone interface, or other output circuitry. Using one or more input and output interfaces, devices, and circuits, of user interface equipment 232, wireless device 210 may communicate with end users and/or the wireless network, and allow them to benefit from the functionality described herein.

Auxiliary equipment 234 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 234 may vary depending on the embodiment and/or scenario.

Power source 236 may, in some embodiments, be in the form of a battery or battery pack. Other types of power sources, such as an external power source (e.g., an electricity outlet), photovoltaic devices or power cells, may also be used. Wireless device 210 may further comprise power circuitry 237 for delivering power from power source 236 to the various parts of wireless device 210 which need power from power source 236 to carry out any functionality described or indicated herein. Power circuitry 237 may in certain embodiments comprise power management circuitry. Power circuitry 237 may additionally or alternatively be operable to receive power from an external power source; in which case wireless device 210 may be connectable to the external power source (such as an electricity outlet) via input circuitry or an interface such as an electrical power cable. Power circuitry 237 may also in certain embodiments be operable to deliver power from an external power source to power source 236. This may be, for example, for the charging of power source 236. Power circuitry 237 may perform any formatting, converting, or other modification to the power from power source 236 to make the power suitable for the respective components of wireless device 210 to which power is supplied.

As described above, 5G NR supports stringent QoS requirement categories. Although the 5G NR specification allows great flexibly in configuring the TDD_UL/DL patterns, in practice only a limited number of TDD patterns can be supported. This is especially true when 5G NR must co-exist with the 4G LTE system in the same frequency band. Additionally, it should be noted that the TDD network is synchronized and therefore all the macro cells must use the same TDD configuration in order to avoid interference. Currently, based on the network traffic and co-existence requirement between 5G NR and 4G LTE, four TDD patterns are supported in practice. These patterns are described in relation to FIG. 3 below.

Figure 3:
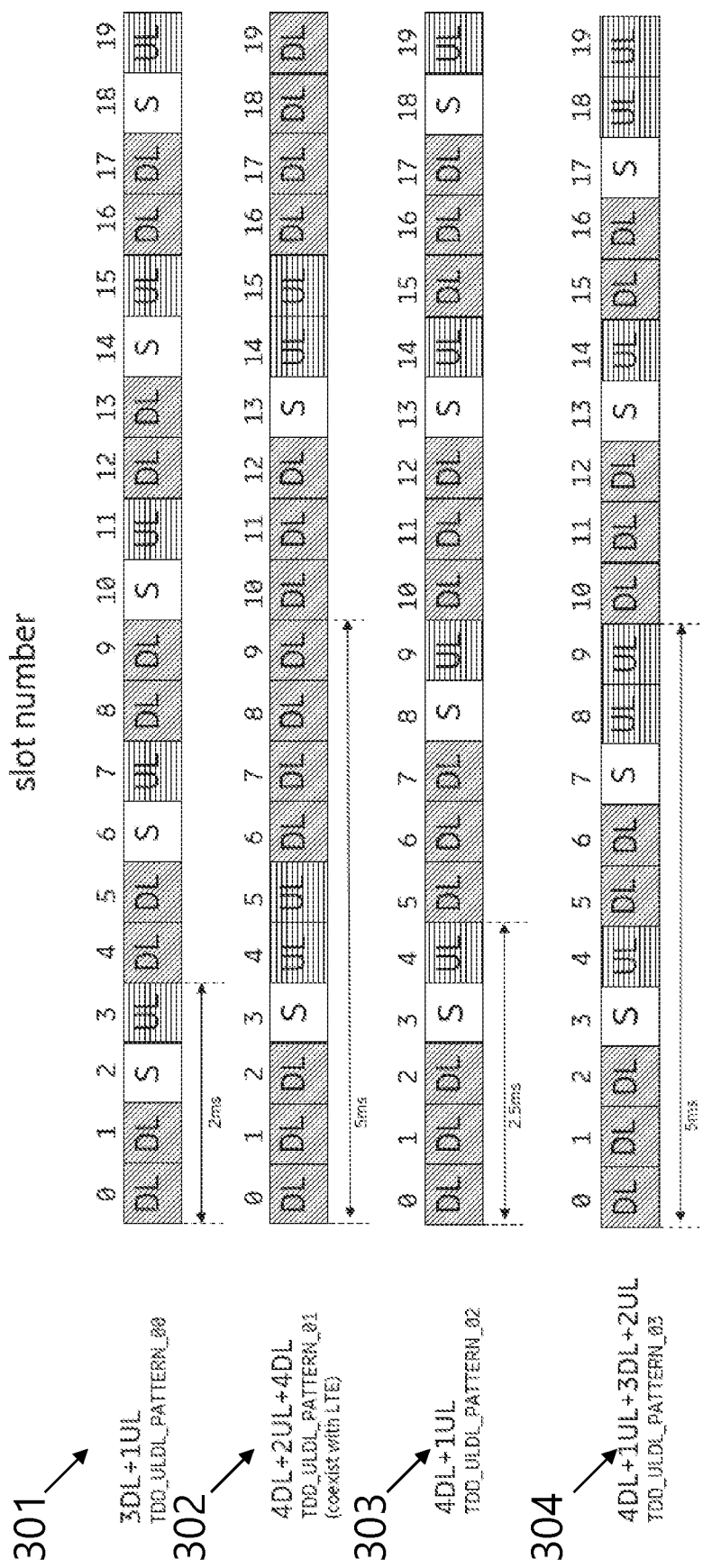
FIG. 3 illustrates four exemplary TDD patterns, in accordance with certain embodiments.

FIG. 3 illustrates four exemplary TDD patterns, in accordance with certain embodiments. More particularly, FIG. 3 illustrates the TDD patterns supported in practice based on the network traffic and co-existence requirement between 5G NR and 4G LTE. Specifically, FIG. 3 illustrates the following TDD patterns: 3DL+1UL (TDD_ULDL_PATTERN_00) indicated by reference numeral 301; 4DL+2UL+4DL (TDD_UL_DL_PATTERN_01) indicated by reference numeral 302; 4DL+1UL (TDD_ULDL_PATTERN_02) indicated by reference numeral 303; and 4DL+1UL+3DL+2UL (TDD_ULDL_PATTERN_03) indicated by reference numeral 304. For each TDD pattern illustrated in FIG. 3, there are shown a plurality of subframes numbered 0-19, with each subframe including a notation of "DL," "UL," or "S". In the context of FIG. 3, the notation "DL" indicates a DL subframe, the notation "UL" indicates an UL subframe, and the notation "S" indicates a special subframe used in between DL and UL subframes. Special subframes can be flexible in terms of which portion is used for UL or DL and offer enough switch timing between DL and UL for all the devices in the cell.

The corresponding delays for the TDD patterns illustrated in FIG. 3 are given in Table 2 below.

TABLE 2

Possible Supported UL Upper Bound Latency 1 TX (30 kHz Sub-Carrier Spacing)

| TDD Pattern | Slot-based scheduling (ms) | 7OS mini-slot (ms) | 2OS mini-slot (ms) |
|---|---|---|---|
| 3DL + 1UL (TDD_ULDL_PATTERN_00) | UL: 3.5 DL: 2.2 | UL: 2.2 DL: 1.4 | UL: 1.9 DL: 1.1 |
| 4DL + 2UL + 4DL (TDD_UL_DL_PATTERN_01) | UL: 5.5 DL: 2.9 | UL: 4.7 DL: 2.0 | UL: 4.4 DL: 1.6 |
| 4DL + 1UL (TDD_ULDL_PATTERN_02) | UL: 4.5 DL: 2.2 | UL: 2.7 DL: 1.4 | UL: 2.4 DL: 1.1 |
| 4DL + 1UL + 3DL + 2UL (TDD_ULDL_PATTERN_03) | UL: 4.5 DL: 2.9 | UL: 2.7 DL: 2.0 | UL: 2.4 DL: 1.6 |

As can be seen from Table 2 above, among the TDD patterns depicted in FIG. 3, the most latency critical pattern is 4DL+2UL+4DL (indicated by reference numeral 302), which consists of 8 consecutive DL slots (including one special subframe). In the worst case scenario, potentially, a UE might need to wait for longer than 8 slots to transmit an UL packet. Mini-slot based scheduling will reduce the transmission time over the air, but with very limited improvement of overall delay. That is because most of the latency contribution is due to the TDD pattern. Using the 4DL+2UL+4DL pattern as an example, if the application layer and physical layer to Packet Data Convergence Protocol (PDCP) layer delays are taken into account, this configuration in the UL direction has a delay of around 6-7 ms if slot-based scheduling is used. Using mini-slot based scheduling can only reduce the delay by at most 1 ms due to the reason described above (i.e., because most of the latency contribution is due to the TDD pattern).

As is evident from the QoS requirement table (Table 5.7.4-1) reproduced above, in 5G NR there are some services that have an extremely short latency budget. For example, 5QI table row 85 (5QI85) in Table 5.7.4-1 in 3GPP TS 23.501 V16.2.0 is reproduced below:

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 85 | Delay Critical GBR | 21 | 5 ms (NOTE 5) | $10^{-5}$ | 255 bytes | 2000 ms | Electricity Distribution— high voltage (see TS 22.261 [2]) |

As can be seen, 5QI table row 85 has a PDB of 5 ms and a Packet Error Rate (PER) $<10^{-5}$. Considering the processing time, a 5 ms PDB gives only around 3 ms delay budget in the radio access network (RAN). Robust link adaptation can be used to achieve the PER target. Due to the TDD configurations, however, such a strict latency requirement is very difficult to achieve in the UL direction, especially considering an operator has to offer different services to different users.

End-to-end (E2E) latency is limited by TDD pattern and/or by traffic load. Moreover, in macro wide area, TDD patterns of different operators are synchronized, which makes it cumbersome for one network to optimize latency against certain traffic without affecting another network.

Mid (e.g., 3-6 GHz) and high (e.g., 24-40 GHz) frequency bands are supported by NR, especially in TDD operation together with the typical low-band used by LTE (e.g., frequency bands below 3 GHz). Typically, one mobile network operator owns multiple bands, for example: low band initially for LTE network and gradually migrate to NR low band FDD with 15 kHz subcarrier spacing (SCS); mid-band TDD band with 30 kHz SCS; and high band TDD with 120 kHz SCS. Therefore, potentially band pairing with carrier configuration can be used to enhance latency performance. Instead of waiting for the UL instance of a DL heavy TDD pattern, it is possible to transmit UL in another band where there is available air interface resource(s). For example: TDD mid-band+low band FDD; TDD high-band+ low band FDD; and/or TDD high-band+unsynchronized TDD high/mid-band.

The above-described practical restrictions cause great latency in scheduling the UL packages and, in some cases, the latency is too large to fulfill the QoS requirement. In such a case, certain services cannot be deployed in the NR system. The present disclosure contemplates various embodiments for scheduling UL transmission with strict latency requirement in multiple bands to reduce latency with sufficient reliability. As described in more detail below, certain embodiments take advantage of PUSCH configured grant (CG) (also referred to as semi-persistent scheduling, UL without PDCCH, grant-free UL, pre-configured UL resource) to configure the UE with UL transmission resources based on the QoS requirement. For example, certain embodiments configure an UL CG PUSCH transmission instance on at least one carrier/band so that the QoS requirement can be fulfilled.

Returning to FIG. 2, in certain embodiments a network node (e.g., network node 260) may determine one or more QoS parameters required by a service carried by a wireless device (e.g., wireless device 210). Network node 260 determines an aggregated UL scheduling pattern for wireless device 210 that fulfills a delay requirement of the service. As described in more detail below, network node 260 may determine the aggregated UL scheduling pattern for the wireless device in a variety of ways (e.g., based on available UL resources of a plurality of UL carriers/bands configured for the wireless device and/or other suitable criteria).

More particularly, according to one example embodiment, network node 260 determines, based on one or more QoS parameters, an aggregated UL scheduling pattern for wireless device 210. The aggregated UL scheduling pattern for wireless device 210 comprises UL resources from a plurality of carriers. The one or more QoS parameters indicate one or more QoS requirements associated with a service, and at least one of the one or more QoS parameters indicates a delay requirement associated with the service. The aggregated UL scheduling pattern may advantageously fulfill the one or more QoS requirements associated with the service (e.g., the delay requirement of the service).

The present disclosure contemplates that network node 260 may obtain the one or more QoS parameters in any suitable manner. The one or more QoS parameters may include a 5QI parameter. In certain embodiments, at least one of the one or more QoS parameters may be a PDB of the service.

The present disclosure contemplates that network node 260 may determine the aggregated UL scheduling pattern for wireless device 210 in a variety of ways. As one example, network node 260 may determine the aggregated UL scheduling pattern for wireless device 210 based on a respective TDD pattern for at least one carrier configured for wireless device 210.

As another example, network node 260 may determine the aggregated UL scheduling pattern for wireless device 210 based on available UL resources of one or more carriers configured for wireless device 210. For example, network node 260 may determine the available UL resources of the one or more carriers configured for wireless device 210 and select one or more UL resources from the one or more carriers configured for wireless device 210 that fulfill the one or more QoS requirements associated with the service. As described above, the aggregated UL scheduling pattern for wireless device 210 comprises UL resources from a plurality of carriers. In certain embodiments, the plurality of carriers may be a subset of the one or more carriers configured for the wireless device.

As still another example (described in more detail below in relation to FIG. 4), network node 260 may determine a scheduling transmission instance that fulfills the PDB of the service. Network node 260 may determine the aggregated UL scheduling pattern based on the determined scheduling transmission instance.

As described above, the aggregated UL scheduling pattern for wireless device 210 comprises UL resources from a plurality of carriers. In certain embodiments, the plurality of carriers may comprise at least one TDD carrier and at least one FDD carrier. For example, the plurality of carriers may comprise a TDD mid band and an FDD low band. As another example, the plurality of carriers may comprise a TDD high band and an FDD low band. In certain embodiments, the plurality of carriers may comprise a plurality of TDD carriers. For example, the plurality of carriers may comprise: a TDD high band; and one or more of: an unsynchronized TDD high band; and an unsynchronized TDD mid band. In certain embodiments, the plurality of carriers may comprise a plurality of FDD carriers. Depending on the implementation, the aggregated UL scheduling pattern may comprise UL resources from a licensed band(s), unlicensed band(s), and/or a SUL carrier(s) (or any combination thereof). In some implementations, the aggregated UL scheduling pattern for wireless device 260 may comprise UL resources from a plurality of bandwidth parts.

In certain embodiments, in connection with determining the aggregated UL scheduling pattern for wireless device 210, network node 260 may determine one or more of: a configured grant usage for each of the plurality of carriers; a set of time domain hypotheses to fulfill a PDB of the service; a configured time domain resource; a configured grant periodicity; and a set of configured grant parameters.

Network node 260 may configure wireless device 210 with the aggregated UL scheduling pattern. The present disclosure contemplates that network node 260 may configure wireless device 210 with the aggregated UL scheduling pattern in a variety of ways. As one example, network node 260 may configure wireless device 210 with one or more subpatterns of the aggregated UL scheduling pattern (e.g., such as the exemplary subpatterns illustrated in FIG. 5 described in more detail below, including a first subpattern of UL resources in a 30 kHz TDD carrier 501 and a second subpattern of UL resources in a 15 kHz FDD subframe 502, which together make up an aggregated UL scheduling pattern). Each of the one or more subpatterns may correspond to one of the plurality of carriers.

As another example, network node 260 may configure wireless device 210 with the determined aggregated UL scheduling pattern using at least one CG for one or more PUSCH transmissions. In some implementations, the CG may be a configured grant type 1, where RRC signaling is used to provide an UL grant, including activation of the grant. In some implementations, the CG may be a configured grant type 2, where RRC signaling provides a transmission periodicity, and L1/L2 control signaling is used to activate and deactivate the transmission. In certain embodiments, network node 260 may configure wireless device 210 with the determined aggregated UL scheduling pattern using at least one dynamic grant and the at least one CG for one or more PUSCH transmissions. In certain embodiments, the at least one CG may comprise information described above as being determined by network node 260 (e.g., one or more of: the configured time domain resource; the configured grant periodicity; and the set of configured grant parameters). In certain embodiments, network node 260 may configure wireless device 210 with one or more subpatterns of the aggregated UL scheduling pattern using the at least one CG grant for one or more PUSCH transmissions.

As another example, network node 260 may configure wireless device 210 with the determined aggregated UL scheduling pattern by dynamically scheduling wireless device 210 to transmit in accordance with the aggregated UL scheduling pattern. In some implementations, network node 260 may dynamically schedule wireless device 210 to transmit in accordance with the aggregated UL scheduling pattern using at least one dynamic grant (e.g., a dynamic grant carried by DCI and/or PDCCH).

In certain embodiments, network node 260 may schedule wireless device 210 with additional UL resources using a dynamic grant together with the aggregated UL scheduling pattern based on the QoS parameters.

As alluded to above, in some implementations the aggregated UL scheduling pattern determined by network node 260 may be used by wireless device 210 to select the UL resources wireless device 210 will use for performing UL transmission in a way that satisfies the applicable latency requirement(s) of a service. In other words, network node 260 may determine an aggregated UL scheduling pattern for wireless device 210 as described above (e.g., based on a delay budget of a service), but wireless device 210 ultimately determines (e.g., selects) which of the UL resources from the determined aggregated UL scheduling pattern wireless device 210 will actually use for performing UL transmission. Such an implementation may, for example, be useful where network node 260 allocates resources for the aggregated UL scheduling pattern but wireless device 210 does not need to use all the UL resources in the aggregated UL scheduling pattern in order to satisfy its QoS requirements. For example, in certain embodiments wireless device 210 obtains a configuration for an aggregated UL scheduling pattern (e.g., a configuration for an aggregated UL scheduling pattern determined by network node 260 as described above). The aggregated UL scheduling pattern comprises UL resources from a plurality of carriers. Wireless device 210 determines one or more of the UL resources from the aggregated UL scheduling pattern based on one or more QoS parameters. Similar to the example embodiment described above, the one or more QoS parameters indicate one or more QoS requirements associated with a service, and at least one of the one or more QoS parameters indicates a delay requirement associated with the service. For example, the one or more QoS parameters may include a 5QI parameter and the at least one of the one or more QoS parameters may be a PDB of the service. Wireless device 210 then performs UL transmission using the one or more determined UL resources.

The present disclosure contemplates that wireless device 210 may obtain the configuration for the aggregated UL scheduling pattern in any suitable manner. As one example, wireless device 210 may obtain the configuration for the aggregated UL scheduling pattern based on at least one CG for one or more PUSCH transmissions (e.g., a CG received from a network node, such as network node 260). As another example, wireless device 210 may obtain the configuration for the aggregated UL scheduling pattern based on at least one dynamic grant and the at least one CG for one or more PUSCH transmissions. Similar to the example embodiment described above, the at least one CG may be a configured grant type 1 or a configured grant type 2. In certain embodiments, the at least one CG may include a configured time domain resource, a configured grant periodicity, and/or a set of configured grant parameters.

As another example, wireless device 210 may obtain the configuration for the aggregated UL scheduling pattern by being dynamically scheduled to transmit in accordance with the aggregated UL scheduling pattern. For example, wireless device 210 may receive at least one dynamic grant (e.g., from a network node, such as network node 260). In some implementations, the at least one dynamic grant may be carried by DCI. In some implementations, the at least one dynamic grant may be carried by PDCCH.

In certain embodiments, the aggregated UL scheduling pattern for wireless device 210 may be determined (e.g., by network node 260) as described above (e.g., based on a respective TDD pattern for at least one carrier configured for the wireless device and/or based on available UL resources of one or more carriers configured for the wireless device).

As described above, the aggregated UL scheduling pattern comprises UL resources from a plurality of carriers. In certain embodiments, the plurality of carriers may comprise a plurality of TDD carriers. For example, the plurality of carriers may comprise: a TDD high band; and one or more of: an unsynchronized TDD high band; and an unsynchronized TDD mid band. In certain embodiments, the plurality of carriers may comprise at least one TDD carrier and at least one FDD carrier. For example, the plurality of carriers may comprise a TDD mid band and an FDD low band. As another example, the plurality of carriers may comprise a TDD high band and an FDD low band. In certain embodiments, the plurality of carriers may comprise a plurality of FDD carriers. In certain embodiments, the plurality of carriers may be a subset of the one or more carriers configured for the wireless device. The aggregated UL scheduling pattern may advantageously fulfill the delay requirement of the service.

Depending on the implementation, the aggregated UL scheduling pattern may comprise UL resources from a licensed band(s), unlicensed band(s), and/or a SUL carrier(s) (or any combination thereof). In some implementations, the aggregated UL scheduling pattern for wireless device 260 may comprise UL resources from a plurality of bandwidth parts.

Figure 4:
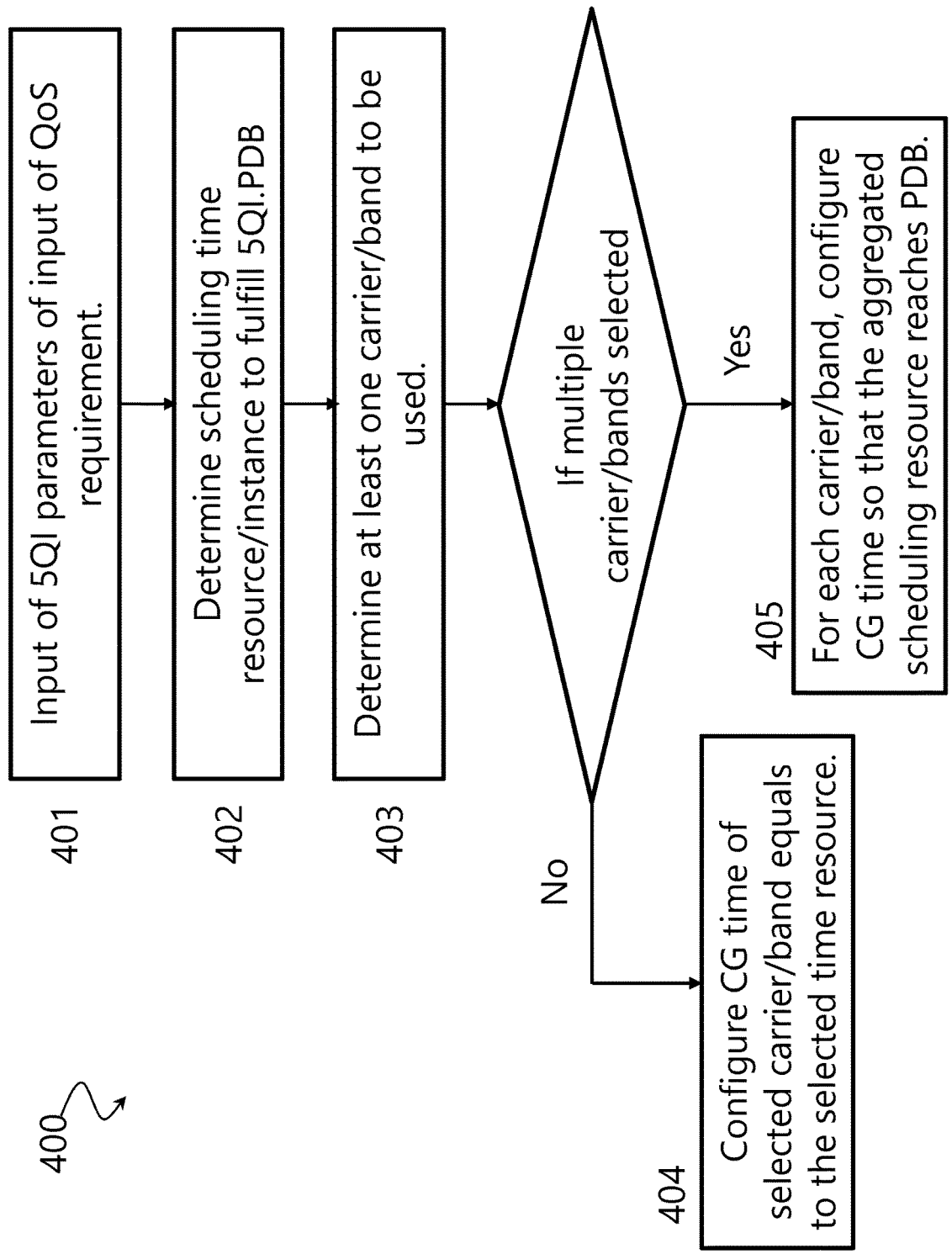
FIG. 4 is a flowchart of a method in a network node, in accordance with certain embodiments.

FIG. 4 illustrates a flow chart of a method in a network node, in accordance with certain embodiments. Method 400 begins at step 401 with the input (e.g., obtaining) of 5QI parameters or input (e.g., obtaining) of QoS requirement(s) of a service. The service may be associated with a wireless device (e.g., wireless device 210 described above in relation to FIG. 2). At step 402, the network node (e.g., network node 260 described above in relation to FIG. 2) determines a scheduling time/instance (T) to fulfill the PDB of the service. In this context, the scheduling/time instance (T) refers to a periodicity and a time offset that is allocated (e.g., scheduled) by the network node. In certain embodiments, the network node may determine the scheduling time/instance (T) to fulfill the PDB based on the QoS requirement of the service (e.g., represented by the a 5G 5QI parameter). For example, in order to fulfill a 3 ms RAN PDB, the network node may determine the scheduling instance (T) of every 0.5 ms.

At step 403, the network node determines (e.g., selects) one or more carriers/bands that can provide the required scheduling time and frequency resource to fulfill the 5QI QoS requirements (which may include, for example, PDB and reliability requirement).

If one carrier/band is selected, the method proceeds to step 404 where the UL CG scheduling instance is set equal to the selected scheduling time/instance (T).

If more than one carriers/bands are selected, the network node identifies an UL pattern that fulfills the PDB when considering all the available UL resources in all the carriers/bands that are configured for the wireless device. An aggregated UL scheduling pattern is then determined. Note that a scheduling pattern may also be referred to as a resource allocation pattern. As long as an aggregated UL pattern that fulfills the PDB is identified, it is not necessary for the network node to use all the carriers/bands. For example, if the wireless device is configured with 4 different carriers/bands in the UL, and by using two of carriers/band an UL pattern can be formulated to fulfill the PDB, then the network node does not need to use all 4 carriers/bands.

Then, at step 405, the network node configures the wireless device with the determined aggregated UL pattern, for example by using CG PUSCH configured grant (also referred to herein as CG for one or more PUSCH transmissions) for each of the carriers/bands. In other words, the aggregated UL pattern may consist of a subpattern in each respective carrier/band, and the network node may use a configured grant in each of the carriers/bands to configure the respective subpattern in that carrier/band, so that the aggregated UL pattern is thereby configured. If the wireless device does not support multiple carrier/band operation, the network node can select one carrier that can fulfill the PDB among a set of available carriers/bands for the wireless device as its UL. In certain embodiments, the network node can also reallocate resources considering different wireless device capabilities. For example, a wireless device supporting multiple carrier/band operation scheduled on a single carrier can be rescheduled to multiple carriers to make room for the network node to schedule a wireless device that supports a single carrier/band.

As described above, in NR bandwidth part is supported. Therefore, the aggregation of the UL pattern can also be applied among different bandwidth parts.

As described above in relation to FIG. 2, the aggregated UL scheduling pattern includes a collection of available UL resources. In certain embodiments, the wireless device can determine/select which of these UL resources it will use for the UL transmission, so that one or more QoS requirements of a service can be met. In other words, the wireless device can determine/select which of the available UL resources to use based on one or more QoS parameter values associated with a service.

Figure 5:
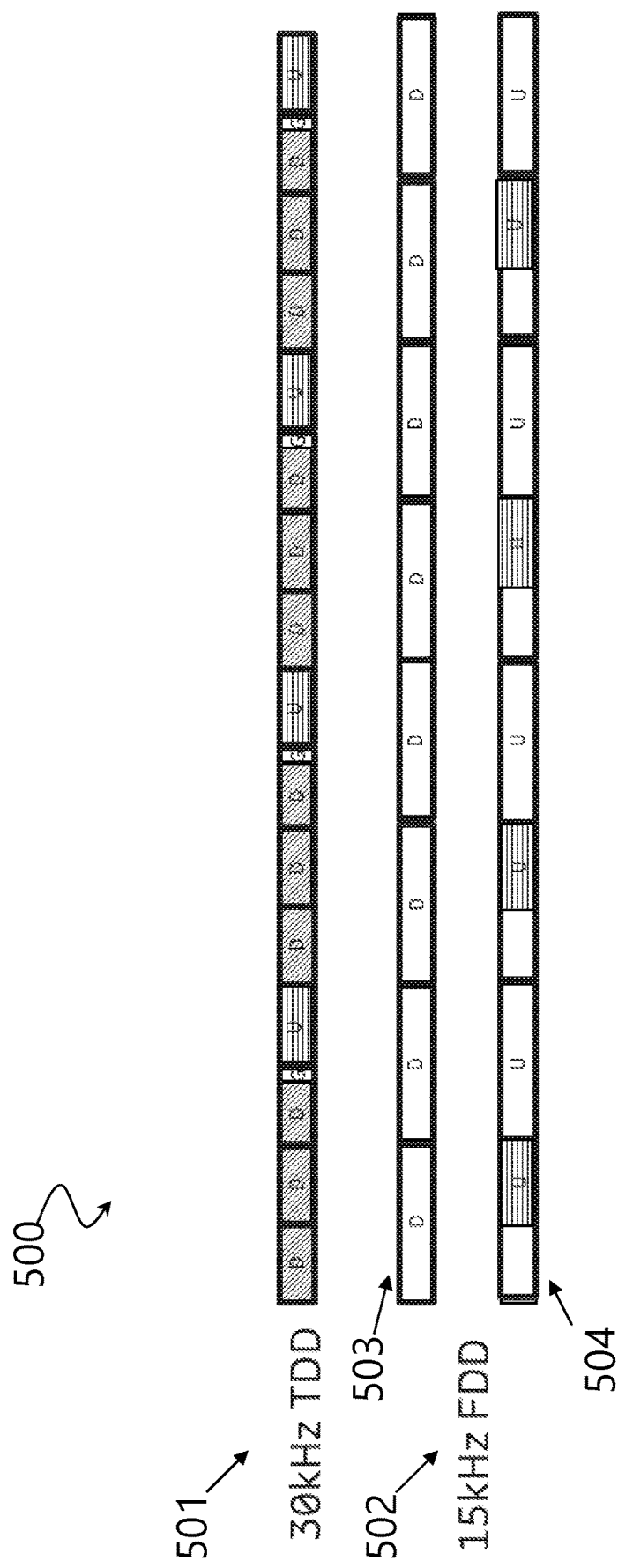
FIG. 5 illustrates an example of configuring a wireless device with CG PUSCH with two carriers, in accordance with certain embodiments.

FIG. 5 illustrates an example of configuring a wireless device with CG PUSCH (also referred to herein as CG for one or more PUSCH transmissions) with two carriers, in accordance with certain embodiments. More particularly, FIG. 5 illustrates an example of an aggregated UL scheduling pattern 500 involving a 30 kHz TDD carrier indicated by reference numeral 501 (with a first subpattern of aggregated UL scheduling pattern 500) and a 15 kHz FDD carrier indicated by reference numeral 502 (with a second subpattern of aggregated UL scheduling pattern 500). In the example of FIG. 5, for both the 30 kHz TDD carrier 501 and the 15 kHz FDD carrier 502 a respective plurality of subframes are shown. Note that with respect to 15 kHz FDD carrier 502, both a DL part 503 and an UL part 504 are shown. A subframe including the notation "D" is a DL subframe, a subframe including the notation "U" is an UL subframe, and the notation "G" is the guard between a DL subframe and an UL subframe. The UL parts with cross marking are the CG PUSCH. Thus, in the example embodiment of FIG. 5, the aggregated UL scheduling pattern 501 comprises both the UL resources of 30 kHz TDD carrier 501 and some of the UL resources of 15 kHz FDD carrier 502. Note that in the example of FIG. 5, in the 15 kHz FDD carrier example a subframe is twice as long as in the 30 kHz TDD. Therefore, only part of an UL subframe (in terms of slots) is needed to be CG PUSCH.

In the example embodiment of FIG. 5, based on the PDB and the PUSCH load of each carrier, a scheduler decides: (1) the configured grant usage of each carrier; (2) a set of time domain resource allocation hypotheses to fulfill the PDB requirement; (3) the configured grant time domain resources; (4) the CG periodicity; and (5) a set of configured grant parameters. Note that for the case illustrated in FIG. 5, there is the constraint that RAN PDB=3 ms and the packet inter-arrival periodicity (PIAP) is 5 ms. Assuming packet arrival time is not known, the CG periodicity can be configured more aggressively than PIAP to reduce the alignment time. One wireless device might be configured with two CGs at different bands with different parameters (e.g., CG periodicity at 30 kHz SCS may be 4 slots and CG periodicity at 15 kHz SCS carrier may be 2 slots).

In certain embodiments, time offset, allocation in time and frequency of CG for each carrier may be determined independently (for example by respective schedulers for the different carriers or by different scheduling processes of the same scheduler). For example, the CG offset for the 15 kHz TDD component carrier may be $7^{th}$ OS of the $1^{st}$ slot and the CG offset for the 30 kHz FDD component carrier may be $1^{st}$ OS at the $3^{rd}$ slot. The allocation length in time may be 7 OS for the 15 kHz FDD component carrier and 14 OS for the 30 kHz TDD component carrier. Additionally, the frequency allocation size for the 15 kHz FDD component carrier may be a PRB needed to transmit 255 bytes and the frequency allocation for the 30 kHz TDD component carrier may be a PRB needed to transmit 255 bytes. In the example of FIG. 5, the possible supported UL upper bound latency is 2.14 ms, which fulfills the QoS requirement of 5QI85.

Note that in the example embodiment of FIG. 5, the SCS of 30 kHz and 15 kHz serve as examples only. It should be understood that all the SCS can be used, including but not limited to 3.75 kHz, 7.5 kHz, 15 kHz, 30 kHz, 45 kHz, 60 kHz, 75 kHz, 120 kHz, 240 kHz, etc.

Figure 6:
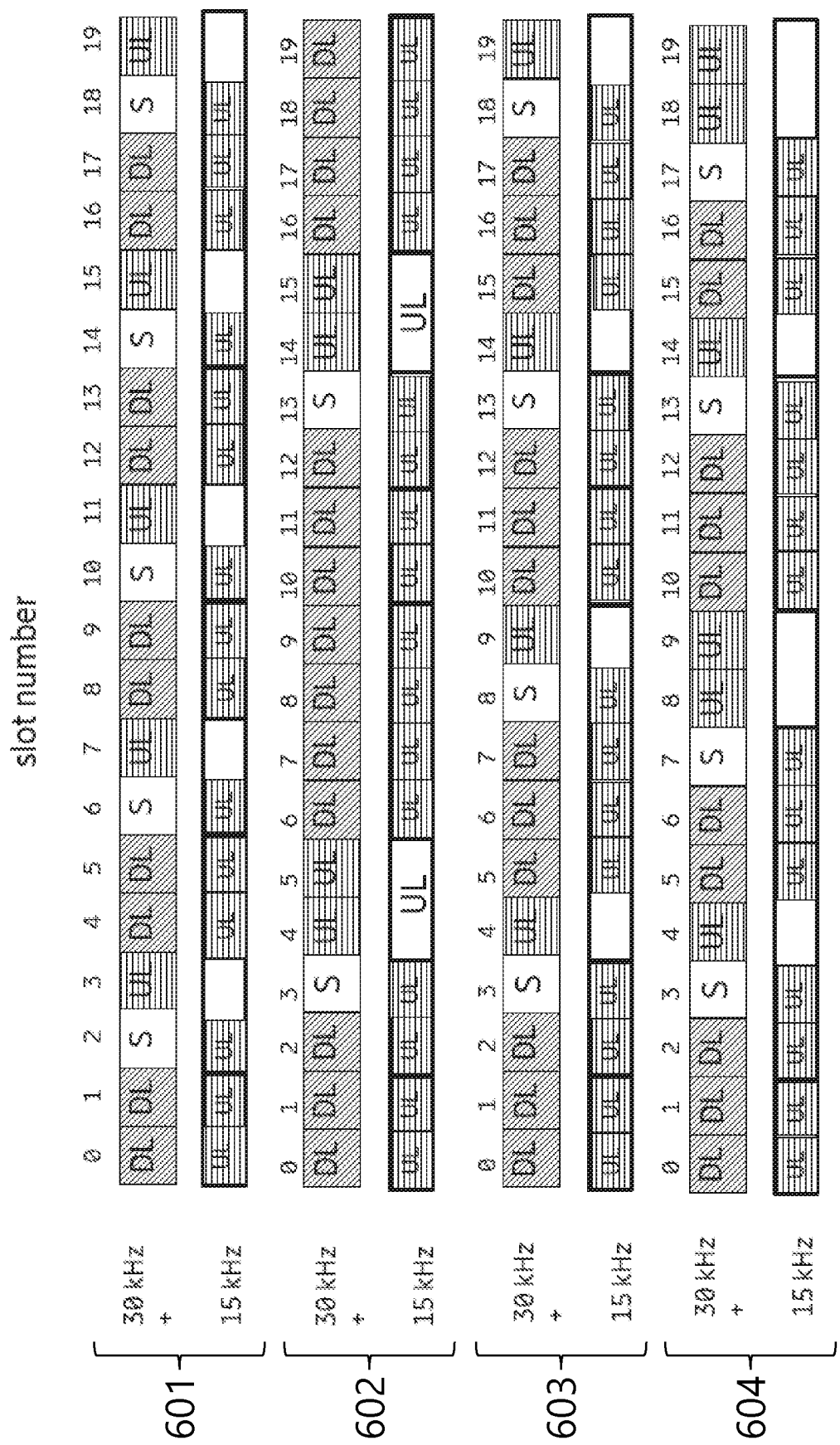
FIG. 6 illustrates further examples of configuring a device with CG PUSCH with different TDD patterns with two carriers, in accordance with certain embodiments.

FIG. 6 illustrates further examples of configuring a wireless device with CG PUSCH (also referred to herein as CG for one or more PUSCH transmissions) with different TDD patterns with two carriers, in accordance with certain embodiments. More particularly, FIG. 6 illustrates a first aggregated UL scheduling pattern with two carriers indicated by reference numeral 601, a second aggregated UL scheduling pattern with two carriers indicated by reference numeral 602, a third aggregated UL scheduling pattern with two carriers indicated by reference numeral 603, and a fourth aggregated UL scheduling pattern with two carriers indicated by reference numeral 604. Each of the example aggregated UL scheduling patterns 601-604 uses one 30 kHz TDD carrier with a TDD pattern and a 15 kHz FDD carrier. Similar to FIG. 3 above, for each carrier of the aggregated UL scheduling patterns 601-604 there are shown a plurality of subframes numbered 0-19, with certain subframes including a notation of "DL," "UL," or "S". In the context of FIG. 6, the notation "DL" indicates a DL subframe, the notation "UL" indicates an UL subframe, and the notation "S" indicates a special subframe used in between DL and UL subframes. As described above, special subframes can be flexible in terms of which portion is used for UL or DL and offer enough switch timing between DL and UL for all the devices in the cell. In the example of FIG. 6, the shaded UL parts are CG PUSCH. In contrast to FIG. 5, no DL part is shown for the 15 kHz FDD carriers in FIG. 6.

Each of the example aggregated UL scheduling patterns 601-604 has a different TDD pattern for its respective 30 kHz TDD carrier. The 30 kHz component carrier for first aggregated UL scheduling pattern 601 corresponds to the 3DL+1UL pattern 301 illustrated in FIG. 3. The 30 kHz component carrier for second aggregated UL pattern 602 corresponds to the 4DL+2UL+4DL pattern 302 illustrated in FIG. 3. The 30 kHz component carrier for third aggregated UL pattern 603 corresponds to the 4DL+1UL pattern 303 illustrated in FIG. 3. The 30 kHz component carrier for fourth aggregated UL pattern 604 corresponds to the 4DL+1UL+3DL+2UL pattern 304 illustrated in FIG. 3. Accordingly, the latency upper bounds for the TDD patterns in the 30 kHz component carriers are as described above in relation to Table 2. The aggregated UL scheduling pattern for each example aggregated UL scheduling pattern 601-604, however, comprises the respective shaded UL portions of the 30 kHz TDD carrier and the 15 kHz FDD carrier. For example, the aggregated UL scheduling pattern for example aggregated UL scheduling pattern 601 comprises the shaded UL subframes numbered 3, 7, 11, 15, and 19 for the 30 kHz TDD carrier and the shaded UL subframes numbered 0-2, 4-6, 8-10, 12-14, and 16-18 for the 15 kHz FDD carrier. The white (unshaded) subframes of the 15 kHz FDD carrier could be used for UL transmissions but are not needed in the aggregated UL pattern. Thus, while the latency upper bounds for the TDD patterns in the 30kHz TDD component carriers are as described above in relation to Table 2, the aggregated UL scheduling patterns shown in FIG. 6, on the other hand, can achieve lower latency. Note that these are non-limiting examples of the achievable UL upper bound latency. All these aggregated UL patterns can achieve latency of 1.6 ms in slot-based scheduling, and less than 1 ms latency if mini-slot-based scheduling is used.

In certain embodiments, it may be a scheduling decision to use the 30 kHz TDD band, 15kHz FDD carrier, or both; depending on the aggregated UL scheduling pattern. When using one of them (i.e., the 30 kHz TDD or 15 kHz FDD carrier), the wireless device will be transmitting in different UL bands at different time slots, switching between different bands. When both are used, the aggregated UL scheduling pattern will have much larger bandwidth at the overlapping slot. In some implementations, an aggregated UL scheduling pattern can be a two-dimensional pattern, time and frequency. Different wireless devices might have different aggregated UL scheduling patterns in frequency domain. For some wireless devices, it might be possible to use both, for example if the wireless devices have good radio conditions and there is a large amount of data to transmit. Other wireless devices might only use one of the carriers if it is likely power limited and there is less data to transmit. In some implementations, the scheduler building up the aggregated UL scheduling pattern may determine which carrier the wireless device shall use to transmit.

In the example of FIG. 6, the SCS of 30 kHz and 15 kHz serve as examples. It should be understood that all the SCS can be used, including but not limited to 3.75 kHz, 7.5 kHz, 15 kHz, 30 kHz, 45 kHz, 60 kHz, 75 kHz, 120 kHz, 240 kHz, etc. Additionally, in the above-described example embodiments, TDD and FDD are used for purposes of illustration only. It should be understood that the present disclosure is not limited to these carrier types. Rather, the present disclosure contemplates that any combination of carrier types can be supported (e.g., TDD+TDD, TDD+FDD, FDD+FDD).

In certain embodiments, supplementary UL (SUL) can also be used (i.e., an UL carrier without a DL carrier).

Additionally, the 5G NR system supports operation in unlicensed bands. It should be understood that the description of carriers/bands herein applies to both licensed and unlicensed bands or any combinations of both.

Furthermore, as discussed above in relation to FIG. 2 dynamic grant can also be used in the various embodiments described herein independently or as a complement to the CG PUSCH to fulfill the PDB. For example, when the network node determines that there is a chance that a scheduling decision may not cause significant interference of neighboring cells or other devices, the network node can use dynamic scheduling to schedule the UL data. As another example, in circumstances of emergency the network node can prioritize the traffic for a wireless device by using dynamic grant. This can be achieved when part of the resource is configured as "flexible" for the UE, where the UE cannot make any assumptions of whether the resource is used for DL or UL.

Figure 7:
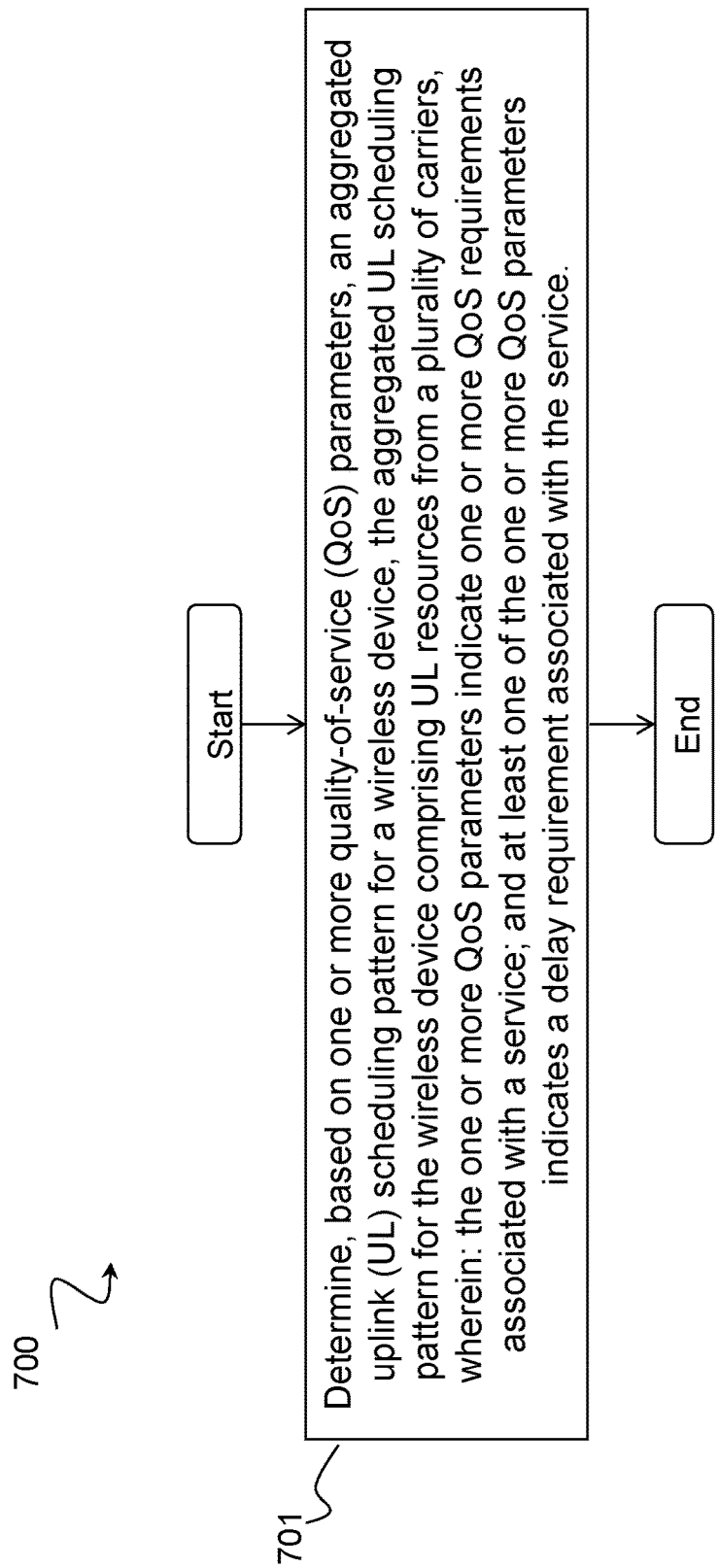
FIG. 7 is a flowchart illustrating an example of a method performed by a network node, in accordance with certain embodiments.

FIG. 7 is a flowchart illustrating an example of a method performed by a network node, in accordance with certain embodiments. More particularly, FIG. 7 illustrates a method 700 performed by a network node (e.g., a gNB). Method 700 begins at step 701, where the network node determines, based on one or more QoS parameters, an aggregated UL scheduling pattern for a wireless device. The aggregated UL scheduling pattern for the wireless device comprises UL resources from a plurality of carriers. The one or more QoS parameters indicate one or more QoS requirements associated with a service, and at least one of the one or more QoS parameters indicates a delay requirement associated with the service.

In certain embodiments, the method may comprise obtaining the one or more QoS parameters. The aggregated UL scheduling pattern may fulfill the one or more QoS requirements associated with the service. In certain embodiments, the one or more QoS parameters may include a 5QI parameter. In certain embodiments, the at least one of the one or more QoS parameters may be a packet delay budget (PDB) of the service. In certain embodiments, the method may comprise determining a scheduling transmission instance that fulfills the PDB of the service. The aggregated UL scheduling pattern may be determined based on the scheduling transmission instance.

In certain embodiments, the aggregated UL scheduling pattern for the wireless device may be determined based on a respective TDD pattern for at least one carrier configured for the wireless device (for example based on a respective TDD pattern for each of a plurality of carriers configured for the wireless device).

In certain embodiments, the aggregated UL scheduling pattern for the wireless device may be determined based on available UL resources of one or more carriers configured for the wireless device. In certain embodiments, determining the aggregated UL scheduling pattern for the wireless device may comprise: determining the available UL resources of the one or more carriers configured for the wireless device; and selecting one or more UL resources from the one or more carriers configured for the wireless device that fulfill the one or more QoS requirements associated with the service. In certain embodiments, the plurality of carriers may be a subset of the one or more carriers configured for the wireless device.

In certain embodiments, the aggregated UL scheduling pattern may fulfill the delay requirement of the service.

In certain embodiments, the plurality of carriers may comprise at least one TDD carrier and at least one FDD carrier. For example, the plurality of carriers may comprise a TDD mid band and an FDD low band. As another example, the plurality of carriers may comprise a TDD high band and an FDD low band.

In certain embodiments, the plurality of carriers may comprise a plurality of TDD carriers. For example, the plurality of carriers may comprise: a TDD high band; and one or more of: an unsynchronized TDD high band; and an unsynchronized TDD mid band.

In certain embodiments, the plurality of carriers may comprise a plurality of FDD carriers.

In certain embodiments, the aggregated UL scheduling pattern may comprise UL resources from a licensed band. In certain embodiments, the aggregated UL scheduling pattern may comprise UL resources from an unlicensed band. In certain embodiments, the aggregated UL scheduling pattern may comprise UL resources from a SUL carrier.

In certain embodiments, determining the aggregated UL scheduling pattern for the wireless device may comprise determining one or more of: a configured grant usage for each of the plurality of carriers; a set of time domain hypotheses to fulfill a PDB of the service; a configured time domain resource; a configured grant periodicity; and a set of configured grant parameters. The network node may configure the wireless device with the determined aggregated UL scheduling pattern using at least one CG for one or more PUSCH transmissions, and the at least one CG may comprise one or more of: the configured time domain resource; the configured grant periodicity; and the set of configured grant parameters.

In certain embodiments, the method may comprise configuring the wireless device with the aggregated UL scheduling pattern. In certain embodiments, configuring the wireless device with the aggregated UL scheduling pattern may comprise configuring the wireless device with one or more subpatterns of the aggregated UL scheduling pattern, wherein each of the one or more subpatterns corresponds to one of the plurality of carriers. In certain embodiments, the network node may configure the wireless device with the determined aggregated UL scheduling pattern using at least one CG for one or more PUSCH transmissions. In certain embodiments, the network node may configure the wireless device with the determined aggregated UL scheduling pattern using at least one dynamic grant and the at least one CG for one or more PUSCH transmissions. In certain embodiments, the at least one CG may comprise one of: a configured grant type 1, wherein RRC signaling is used to provide an uplink grant, including activation of the grant; and a configured grant type 2, wherein RRC signaling provides a transmission periodicity, and L1/L2 control signaling is used to activate and deactivate the transmission.

In certain embodiments, configuring the wireless device with the aggregated UL scheduling pattern may comprise dynamically scheduling the wireless device to transmit in accordance with the aggregated UL scheduling pattern. In certain embodiments, the dynamic scheduling may use at least one dynamic grant.

In certain embodiments, the at least one dynamic grant may be carried by DCI. In certain embodiments, the at least one dynamic grant may be carried by PDCCH.

In certain embodiments, the method may comprise scheduling the wireless device with additional UL resources using a dynamic grant together with the aggregated UL scheduling pattern based on the QoS parameters.

In certain embodiments, the aggregated UL scheduling pattern for the wireless device comprises UL resources from a plurality of bandwidth parts.

Figure 8:
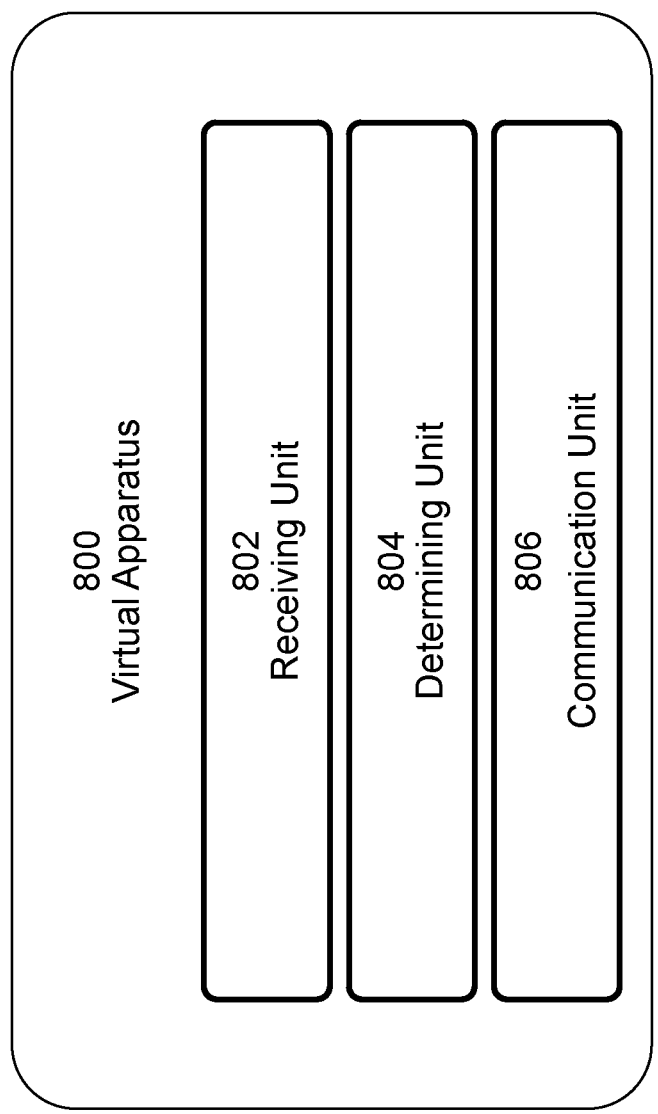
FIG. 8 is a block diagram illustrating an example of a virtual apparatus, in accordance with certain embodiments.

FIG. 8 is a block diagram illustrating an example of a virtual apparatus, in accordance with certain embodiments. More particularly, FIG. 8 illustrates a schematic block diagram of an apparatus 800 in a wireless network (for example, the wireless network shown in FIG. 2). The apparatus may be implemented in a network node (e.g., network node 260 shown in FIG. 2). Apparatus 800 is operable to carry out the example method described with reference to FIG. 7 and possibly any other processes or methods disclosed herein. It is also to be understood that the method of FIG. 7 is not necessarily carried out solely by apparatus 800. At least some operations of the method can be performed by one or more other entities.

Virtual Apparatus 800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 802, determining unit 804, communication unit 806, and any other suitable units of apparatus 800 to perform corresponding functions according one or more embodiments of the present disclosure.

In certain embodiments, apparatus 800 may be an eNB or a gNB. As illustrated in FIG. 8, apparatus 800 includes receiving unit 802, determining unit 804, and communication unit 806. Receiving unit 802 may be configured to perform the receiving functions of apparatus 800. For example, receiving unit 802 may be configured to obtain one or more QoS parameters. As another example, receiving unit 804 may be configured to obtain user data.

Receiving unit 802 may receive any suitable information (e.g., from a wireless device or another network node). Receiving unit 802 may include a receiver and/or a transceiver, such as RF transceiver circuitry 272 described above in relation to FIG. 2. Receiving unit 802 may include circuitry configured to receive messages and/or signals (wireless or wired). In particular embodiments, receiving unit 802 may communicate received messages and/or signals to determining unit 804 and/or any other suitable unit of apparatus 800. The functions of receiving unit 802 may, in certain embodiments, be performed in one or more distinct units.

Determining unit 804 may perform the processing functions of apparatus 800. For example, determining unit 804 may be configured to determine, based on one or more QoS parameters, an aggregated UL scheduling pattern for a wireless device, the aggregated UL scheduling pattern for the wireless device comprising UL resources from a plurality of carriers. The one or more QoS parameters may indicate one or more QoS requirements associated with a service, and the at least one of the one or more QoS parameters may indicate a delay requirement associated with the service.

In certain embodiments, the plurality of carriers may comprise a plurality of FDD carriers. In certain embodiments, the plurality of carriers may comprise at least one TDD carrier and at least one FDD carrier. As one example, the plurality of carriers may comprise a TDD mid band and an FDD low band. As another example, the plurality of carriers may comprise a TDD high band and an FDD low band. In certain embodiments, the plurality of carriers may comprise a plurality of TDD carriers. For example, the plurality of carriers may comprise: a TDD high band; and one or more of: an unsynchronized TDD high band; and an unsynchronized TDD mid band.

In certain embodiments, the aggregated UL scheduling pattern may comprise UL resources from a licensed band. In certain embodiments, the aggregated UL scheduling pattern may comprise UL resources from an unlicensed band. In certain embodiments, the aggregated UL scheduling pattern may comprise UL resources from a SUL carrier. In certain embodiments, the aggregated UL scheduling pattern for the wireless device may comprise UL resources from a plurality of bandwidth parts.

In certain embodiments, determining unit 804 may be configured to determine the aggregated UL scheduling pattern for the wireless device based on a respective TDD pattern for at least one carrier configured for the wireless device. In certain embodiments, determining unit 804 may be configured to determine the aggregated UL scheduling pattern for the wireless device based on available UL resources of one or more carriers configured for the wireless device. For example, determining unit 804 may be configured to determine the available UL resources of the one or more carriers configured for the wireless device and to select one or more UL resources from the one or more carriers configured for the wireless device that fulfill the one or more QoS requirements associated with the service. In certain embodiments, the plurality of carriers may be a subset of the one or more carriers configured for the wireless device.

As another example, determining unit 804 may be configured to obtain the one or more QoS parameters. In certain embodiments, the aggregated UL scheduling pattern may fulfill the one or more QoS requirements associated with the service.

In certain embodiments, the one or more QoS parameters may include a 5QI parameter. In certain embodiments, the one or more QoS parameters may include a parameter indicating a delay requirement of the service. In certain embodiments, the at least one of the one or more QoS parameters may be a PDB of the service.

In certain embodiments, the aggregated UL scheduling pattern may fulfill the delay requirement of the service.

In certain embodiments, determining unit 804 may be configured to determine a scheduling transmission instance that fulfills a PDB of the service. Determining unit 804 may be configured to determine the aggregated UL scheduling pattern based on the scheduling transmission instance.

As still another example, determining unit 804 may be configured to configure the wireless device with the aggregated UL scheduling pattern. In certain embodiments, determining unit 804 may be configured to configure the wireless device with one or more subpatterns of the aggregated UL scheduling pattern. Each of the one or more subpatterns may correspond to one of the plurality of carriers.

In certain embodiments, determining unit 804 may be configured to configure the wireless device with the determined aggregated UL scheduling pattern using at least one CG for one or more PUSCH transmissions. In certain embodiments, determining unit 804 may be configured to configure the wireless device with the determined aggregated UL scheduling pattern using at least one dynamic grant and the at least one CG for one or more PUSCH transmissions. In certain embodiments, the at least one CG may comprise: a configured grant type 1, where RRC signaling is used to provide an UL grant, including activation of the grant; and/or a configured grant type 2, where RRC signaling provides the transmission periodicity, and L1/L2 control signaling is used to activate/deactivate the transmission.

In certain embodiments, determining unit 804 may be configured to configure the wireless device with the aggregated UL scheduling pattern by dynamically scheduling the wireless device to transmit in accordance with the aggregated UL scheduling pattern. In certain embodiments, the dynamic scheduling may use at least one dynamic grant. In certain embodiments, the at least one dynamic grant may be carried by DCI. In certain embodiments, the at least one dynamic grant may be carried by PDCCH.

As another example, determining unit 804 may be configured to determine one or more of: a configured grant usage for each of the plurality of carriers; a set of time domain hypotheses to fulfill a PDB of the service; a configured time domain resource; a configured grant periodicity; and a set of configured grant parameters. In certain embodiments, determining unit 804 may be configured to configure the wireless device with the determined aggregated UL scheduling pattern using at least one CG for one or more PUSCH transmissions, and to include in the at least one CG one or more of: the configured time domain resource; the configured grant periodicity; and the set of configured grant parameters.

In certain embodiments, determining unit 804 may be configured to configure the wireless device with the determined aggregated UL scheduling pattern using at least one or more dynamic grants. In certain embodiments, determining unit 804 may be configured to configure the wireless device with additional UL resources from one or more carriers using at least one dynamic grant together with the aggregated UL scheduling pattern based on the QoS parameters.

As another example, determining unit 804 may be configured to schedule the wireless device with additional UL resources using a dynamic grant together with the aggregated UL scheduling pattern based on the QoS parameters.

As yet another example, determining unit 804 may be configured to obtain user data.

Determining unit 804 may include or be included in one or more processors, such as processing circuitry 270 described above in relation to FIG. 2. Determining unit 804 may include analog and/or digital circuitry configured to perform any of the functions of determining unit 804 and/or processing circuitry 170 described above. The functions of determining unit 804 may, in certain embodiments, be performed in one or more distinct units.

Communication unit 806 may be configured to perform the transmission functions of apparatus 800. For example, communication unit 806 may be configured to configure the wireless device with the aggregated UL scheduling pattern. In certain embodiments, communication unit 806 may be configured to transmit, to the wireless device, a configuration for the aggregated UL scheduling pattern. As another example, communication unit 806 may be configured to transmit, to the wireless device, at least one CG for one or more PUSCH transmissions. As still another example, communication unit 806 may be configured to transmit, to the wireless device, at least one dynamic grant. As another example, communication unit 806 may be configured to forward user data to a host computer or a wireless device.

Communication unit 806 may transmit messages (e.g., to a wireless device and/or another network node). Communication unit 806 may include a transmitter and/or a transceiver, such as RF transceiver circuitry 272 described above in relation to FIG. 2. Communication unit 806 may include circuitry configured to transmit messages and/or signals (e.g., through wireless or wired means). In particular embodiments, communication unit 806 may receive messages and/or signals for transmission from determining unit 804 or any other unit of apparatus 800. The functions of communication unit 804 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

Figure 9:
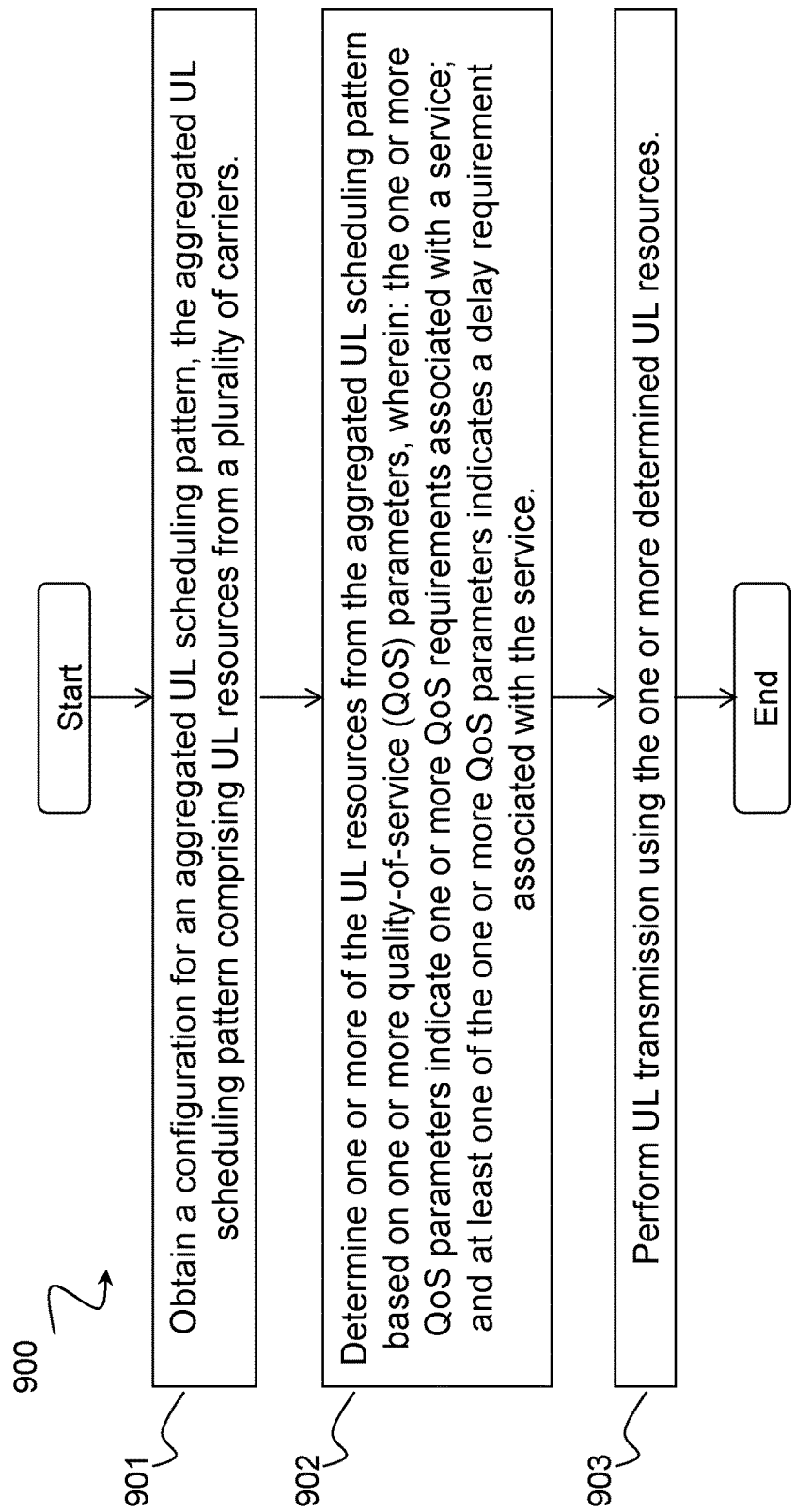
FIG. 9 is a flowchart illustrating an example of a method performed by a wireless device, in accordance with certain embodiments.

FIG. 9 is a flowchart illustrating an example of a method performed by a wireless device, in accordance with certain embodiments. More particularly, FIG. 9 is a flowchart of a method 900 performed by a wireless device (e.g., a UE) for UL transmission. Method 900 begins at step 901, where the wireless device obtains a configuration for an aggregated UL scheduling pattern, the aggregated UL scheduling pattern comprising UL resources from a plurality of carriers. In certain embodiments, the obtained configuration may be a configuration for an aggregated UL scheduling pattern for the wireless device determined by a network, for example as described above in relation to step 701 of FIG. 7.

In certain embodiments, the aggregated UL scheduling pattern may comprise UL resources from a licensed band. In certain embodiments, the aggregated UL scheduling pattern may comprise UL resources from an unlicensed band. In certain embodiments, the aggregated UL scheduling pattern may comprise UL resources from a SUL carrier. In certain embodiments, the aggregated UL scheduling pattern may comprise UL resources from a plurality of bandwidth parts.

In certain embodiments, the wireless device may obtain the configuration for the aggregated UL scheduling pattern based on at least one CG for one or more PUSCH transmissions. In certain embodiments, the wireless device may obtain the configuration for the aggregated UL scheduling pattern based on at least one dynamic grant and the at least one CG for one or more PUSCH transmissions. In certain embodiments, the at least one CG may comprise one of: a configured grant type 1, wherein radio resource control (RRC) signaling is used to provide an uplink grant, including activation of the grant; and a configured grant type 2, wherein RRC signaling provides a transmission periodicity, and L1/L2 control signaling is used to activate and deactivate the transmission. In certain embodiments, the at least one CG may comprise one or more of: a configured time domain resource; a configured grant periodicity; and a set of configured grant parameters.

In certain embodiments, obtaining the configuration for the aggregated UL scheduling pattern may comprise being dynamically scheduled to transmit in accordance with the aggregated UL scheduling pattern. In certain embodiments, being dynamically scheduled to transmit in accordance with the aggregated UL scheduling pattern may comprise receiving at least one dynamic grant. In certain embodiments, the at least one dynamic grant may be carried by DCI. In certain embodiments, the at least one dynamic grant may be carried by PDCCH.

In certain embodiments, the aggregated UL scheduling pattern for the wireless device may be determined based on a respective TDD pattern for at least one carrier configured for the wireless device.

In certain embodiments, the aggregated UL scheduling pattern for the wireless device may be based on available UL resources of one or more carriers configured for the wireless device. In certain embodiments, the plurality of carriers may be a subset of the one or more carriers configured for the wireless device.

In certain embodiments, the aggregated UL scheduling pattern may fulfill the delay requirement of the service.

In certain embodiments, the plurality of carriers may comprise at least one TDD carrier and at least one FDD carrier. In certain embodiments, the plurality of carriers may comprise a TDD mid band and an FDD low band. In certain embodiments, the plurality of carriers may comprise a TDD high band and an FDD low band.

In certain embodiments, the plurality of carriers may comprise a plurality of TDD carriers. In certain embodiments, the plurality of carriers may comprise: a TDD high band; and one or more of: an unsynchronized TDD high band; and an unsynchronized TDD mid band.

In certain embodiments, the plurality of carriers may comprise a plurality of FDD carriers.

At step 902, the wireless device determines one or more of the UL resources from the aggregated UL scheduling pattern based on one or more QoS parameters. The one or more QoS parameters indicate one or more QoS requirements associated with a service, and at least one of the one or more QoS parameters indicates a delay requirement associated with the service. In certain embodiments, the one or more QoS parameters may include a 5QI parameter. In certain embodiments, the at least one of the one or more QoS parameters may be a PDB of the service.

At step 903, the wireless device performs UL transmission using the one or more determined UL resources.

Figure 10:
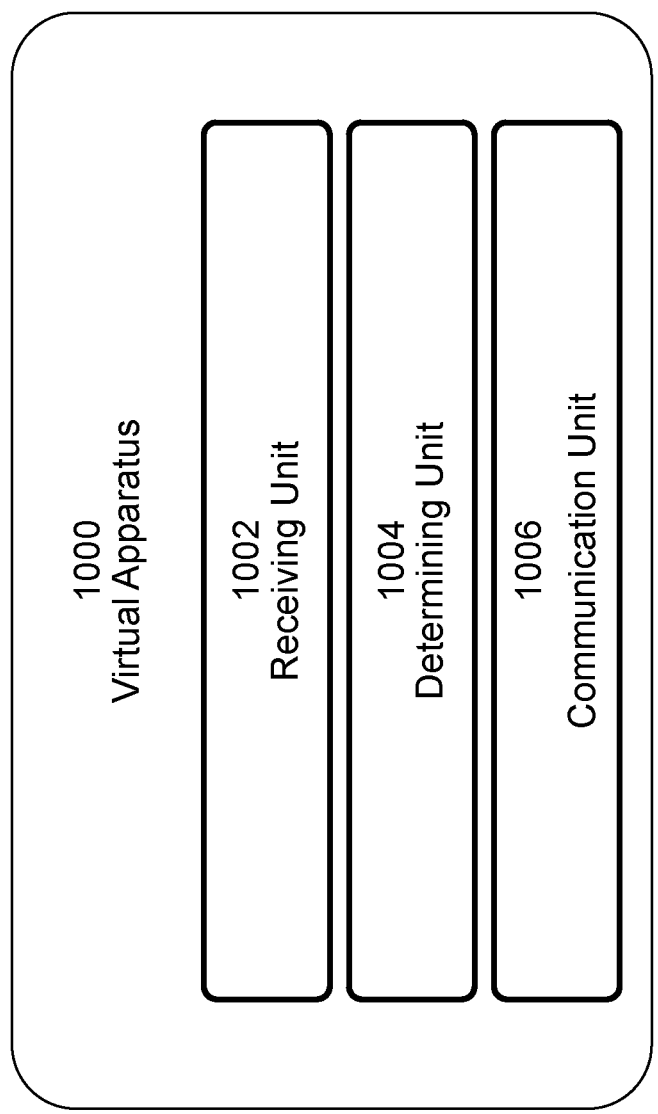
FIG. 10 is a block diagram illustrating an example of a virtual apparatus, in accordance with certain embodiments.

FIG. 10 is a block diagram illustrating an example of a virtual apparatus, in accordance with certain embodiments. More particularly, FIG. 10 illustrates a schematic block diagram of an apparatus 1000 in a wireless network (for example, the wireless network shown in FIG. 2). The apparatus may be implemented in a wireless device (e.g., wireless device 210 shown in FIG. 2). Apparatus 1000 is operable to carry out the example method described with reference to FIG. 9 and possibly any other processes or methods disclosed herein. It is also to be understood that the method of FIG. 9 is not necessarily carried out solely by apparatus 1000. At least some operations of the method can be performed by one or more other entities.

Virtual Apparatus 1000 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1002, determining unit 1004, communication unit 1006, and any other suitable units of apparatus 1000 to perform corresponding functions according one or more embodiments of the present disclosure.

In certain embodiments, apparatus 1000 may be a UE. As illustrated in FIG. 10, apparatus 1000 includes receiving unit 1002, determining unit 1004, and communication unit 1006. Receiving unit 1002 may be configured to perform the receiving functions of apparatus 1000. For example, receiving unit 1002 may be configured to obtain a configuration for an aggregated UL scheduling pattern, the aggregated UL scheduling pattern comprising UL resources from a plurality of carriers. In certain embodiments, receiving unit 1002 may be configured to obtain the configuration for the aggregated UL scheduling pattern based on at least one CG for one or more PUSCH transmissions. In certain embodiments, receiving unit 1002 may be configured to obtain the configuration for the aggregated UL scheduling pattern based on at least one dynamic grant and the at least one CG for one or more PUSCH transmissions. In certain embodiments, the at least one CG may comprise one or more of: a configured time domain resource; a configured grant periodicity; and a set of configured grant parameters. In certain embodiments, the at least on CG may be a configured grant type 1, wherein RRC signaling is used to provide an uplink grant, including activation of the grant. In certain embodiments, the at least one CG may be a configured grant type 2, wherein RRC signaling provides a transmission periodicity, and L1/L2 control signaling is used to activate and deactivate the transmission.

In certain embodiments, apparatus 1000 may be configured to obtain the configuration for the aggregated UL scheduling pattern by being dynamically scheduled to transmit in accordance with the aggregated UL scheduling pattern. In such an embodiment, receiving unit 1002 may be configured to receive at least one dynamic grant. In certain embodiments, the dynamic grant may be carried by DCI. In certain embodiments, the dynamic grant may be carried by PDCCH.

In certain embodiments, the aggregated UL scheduling pattern for the wireless device may be determined based on a respective TDD pattern for at least one carrier (for example for each carrier of a plurality of carriers) configured for the wireless device. In certain embodiments, the aggregated UL scheduling pattern for the wireless device may be based on available UL resources of one or more carriers configured for the wireless device. The plurality of carriers may be a subset of the one or more carriers configured for the wireless device. In certain embodiments, the aggregated UL scheduling pattern may fulfill the delay requirement of the service.

In certain embodiments, the plurality of carriers may comprise at least one TDD carrier and at least one FDD carrier. For example, the plurality of carriers may comprise a TDD mid band and an FDD low band. As another example, the plurality of carriers may comprise a TDD high band and an FDD low band. In certain embodiments, the plurality of carriers may comprise a plurality of TDD carriers. For example, the plurality of carriers may comprise: a TDD high band; and one or more of: an unsynchronized TDD high band; and an unsynchronized TDD mid band. In certain embodiments, the plurality of carriers may comprise a plurality of FDD carriers.

In certain embodiments, the aggregated UL scheduling pattern may comprise UL resources from a licensed band. In certain embodiments, the aggregated UL scheduling pattern may comprise UL resources from an unlicensed band. In certain embodiments, the aggregated UL scheduling pattern may comprise UL resources from a SUL carrier. In certain embodiments, the aggregated UL scheduling pattern may comprise UL resources from a plurality of bandwidth parts. In certain embodiments, the aggregated UL scheduling pattern may comprise any suitable combination of the above.

Receiving unit 1002 may receive any suitable information (e.g., from another wireless device or a network node). Receiving unit 1002 may include a receiver and/or a transceiver, such as RF transceiver circuitry 222 described above in relation to FIG. 2. Receiving unit 1002 may include circuitry configured to receive messages and/or signals (wireless or wired). In particular embodiments, receiving unit 1002 may communicate received messages and/or signals to determining unit 1004 and/or any other suitable unit of apparatus 1000. The functions of receiving unit 1002 may, in certain embodiments, be performed in one or more distinct units.

Determining unit 1004 may perform the processing functions of apparatus 1000. For example, determining unit 1004 may be configured to obtain the configuration for the aggregated UL scheduling pattern, the aggregated UL scheduling pattern comprising UL resources from a plurality of carriers. As another example, determining unit 1004 may be configured to determine one or more of the UL resources from the aggregated UL scheduling pattern based on one or more QoS parameters. The one or more QoS parameters may indicate one or more QoS requirements associated with a service. At least one of the one or more QoS parameters may indicate a delay requirement associated with the service.

In certain embodiments, the one or more QoS parameters may include a 5QI parameter. In certain embodiments, the at least one of the one or more QoS parameters may be a PDB of the service.

As still another example, determining unit 1004 may be configured to provide user data.

Determining unit 1004 may include or be included in one or more processors, such as processing circuitry 220 described above in relation to FIG. 2. Determining unit 1004 may include analog and/or digital circuitry configured to perform any of the functions of determining unit 1004 and/or processing circuitry 220 described above. The functions of determining unit 1004 may, in certain embodiments, be performed in one or more distinct units.

Communication unit 1006 may be configured to perform the transmission functions of apparatus 1000. For example, communication unit 1006 may be configured to perform UL transmission using the one or more determined UL resources. As another example, communication unit 1006 may be configured to forward user data to a host computer via a transmission to a network node.

Communication unit 1006 may transmit messages (e.g., to another wireless device and/or a network node). Communication unit 1006 may include a transmitter and/or a transceiver, such as RF transceiver circuitry 222 described above in relation to FIG. 2. Communication unit 1006 may include circuitry configured to transmit messages and/or signals (e.g., through wireless or wired means). In particular embodiments, communication unit 1006 may receive messages and/or signals for transmission from determining unit 1004 or any other unit of apparatus 1000. The functions of communication unit 1004 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 11:
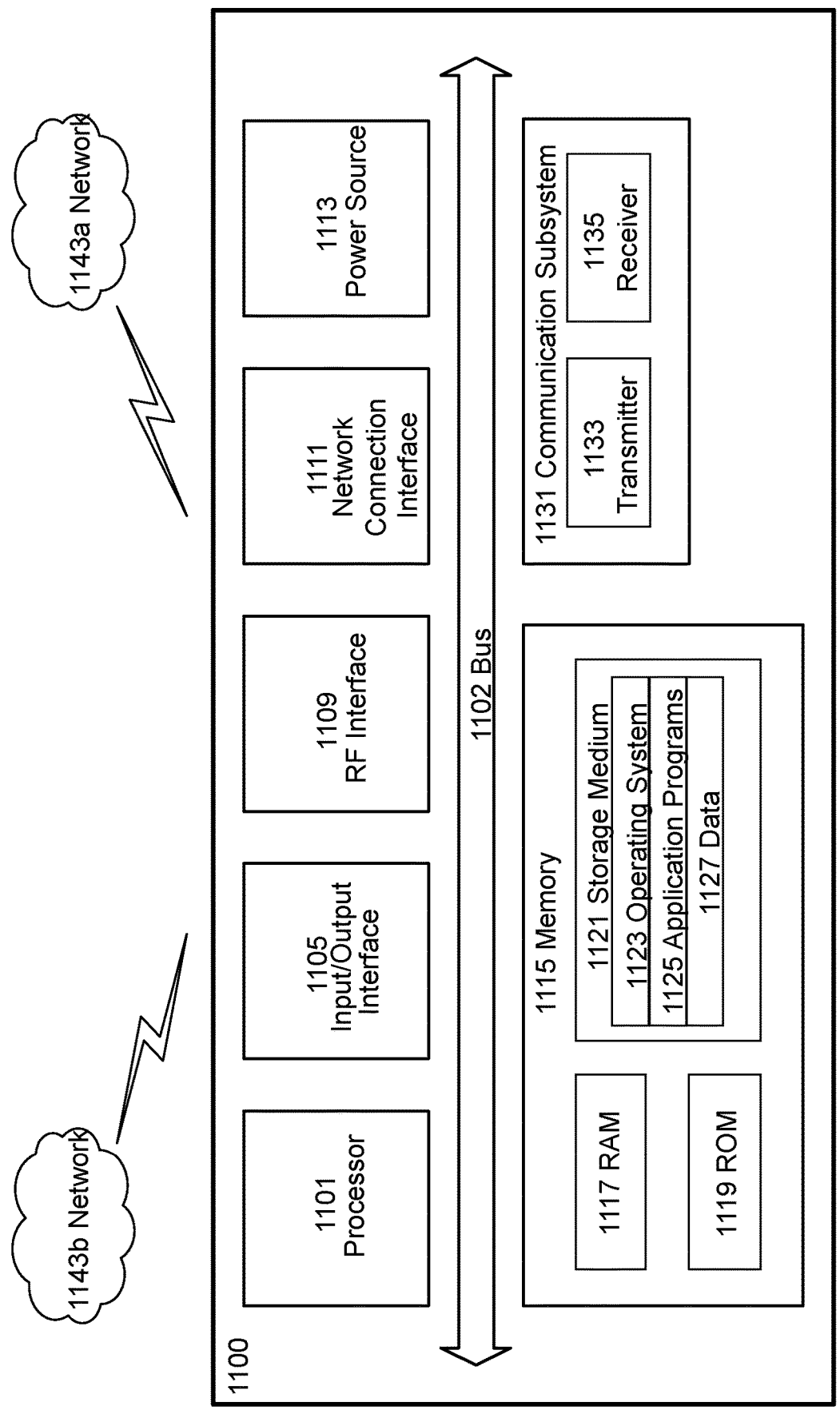
FIG. 11 illustrates an example user equipment, in accordance with certain embodiments.

FIG. 11 illustrates an example UE, in accordance with certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3$^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143*a*. Network 1143*a* may encompass wired and/or wireless networks such as a local-area network (LAN), a wide-area network (WAN), a computer network, a wireless network, a telecommunications network, another like network or any combination thereof. For example, network 1143*a* may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
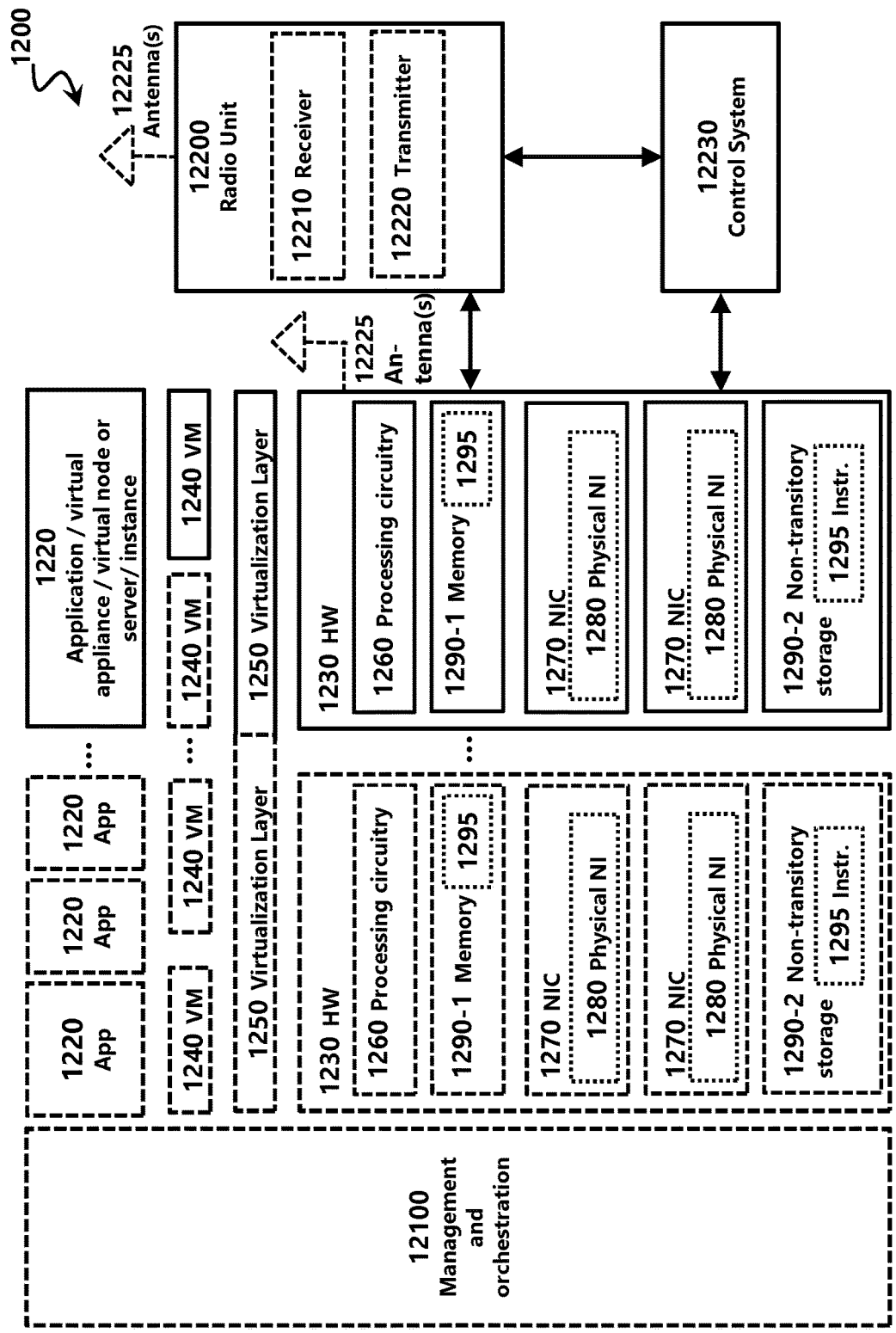
FIG. 12 illustrates an example virtualization environment, in accordance with certain embodiments.

FIG. 12 illustrates an example virtualization environment, in accordance with certain embodiments. More particularly, FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 13:
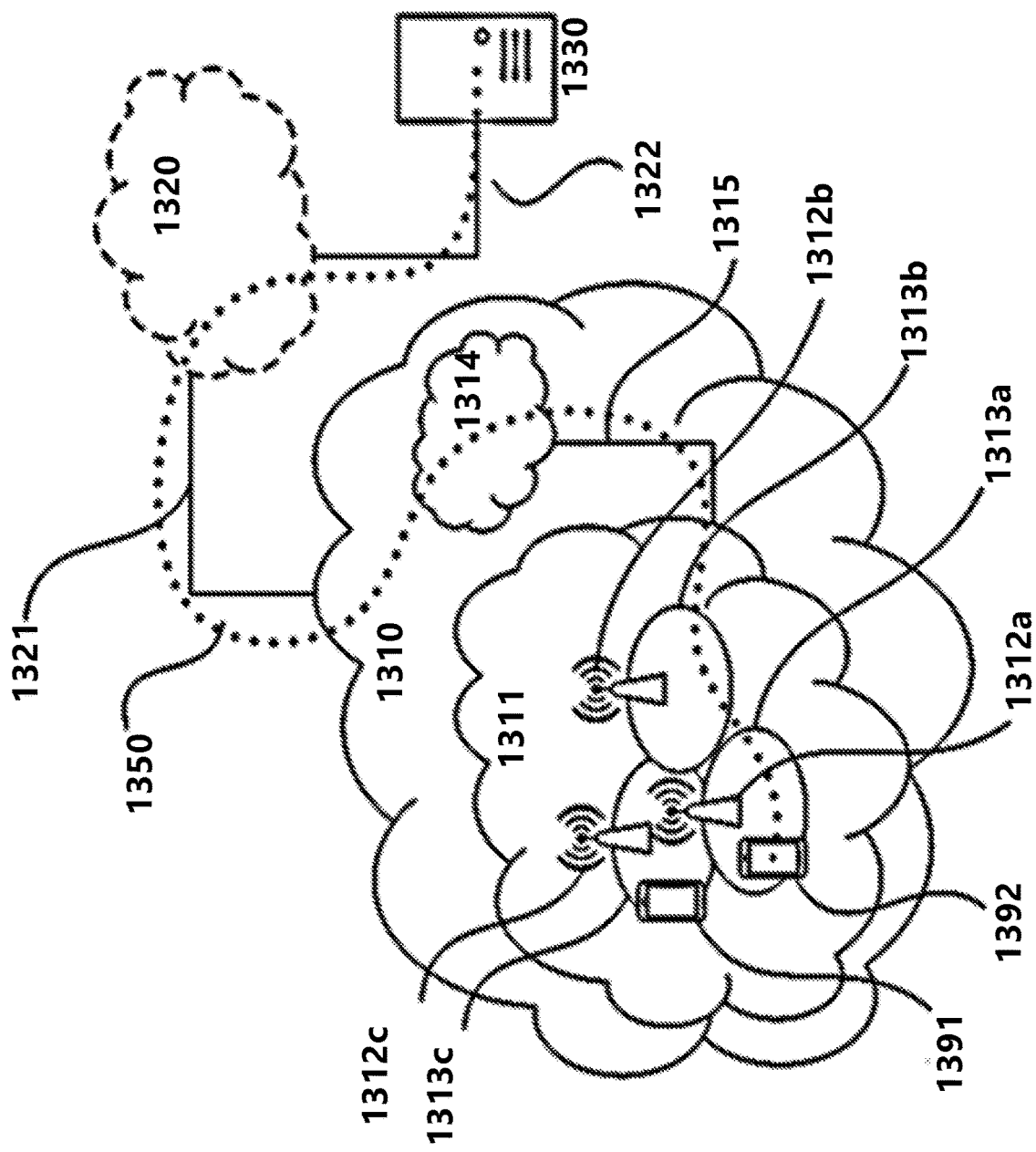
FIG. 13 illustrates an example telecommunication network connected via an intermediate network to a host computer, in accordance with certain embodiments.

FIG. 13 illustrates an example telecommunication network connected via an intermediate network to a host computer, in accordance with certain embodiments. With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 14:
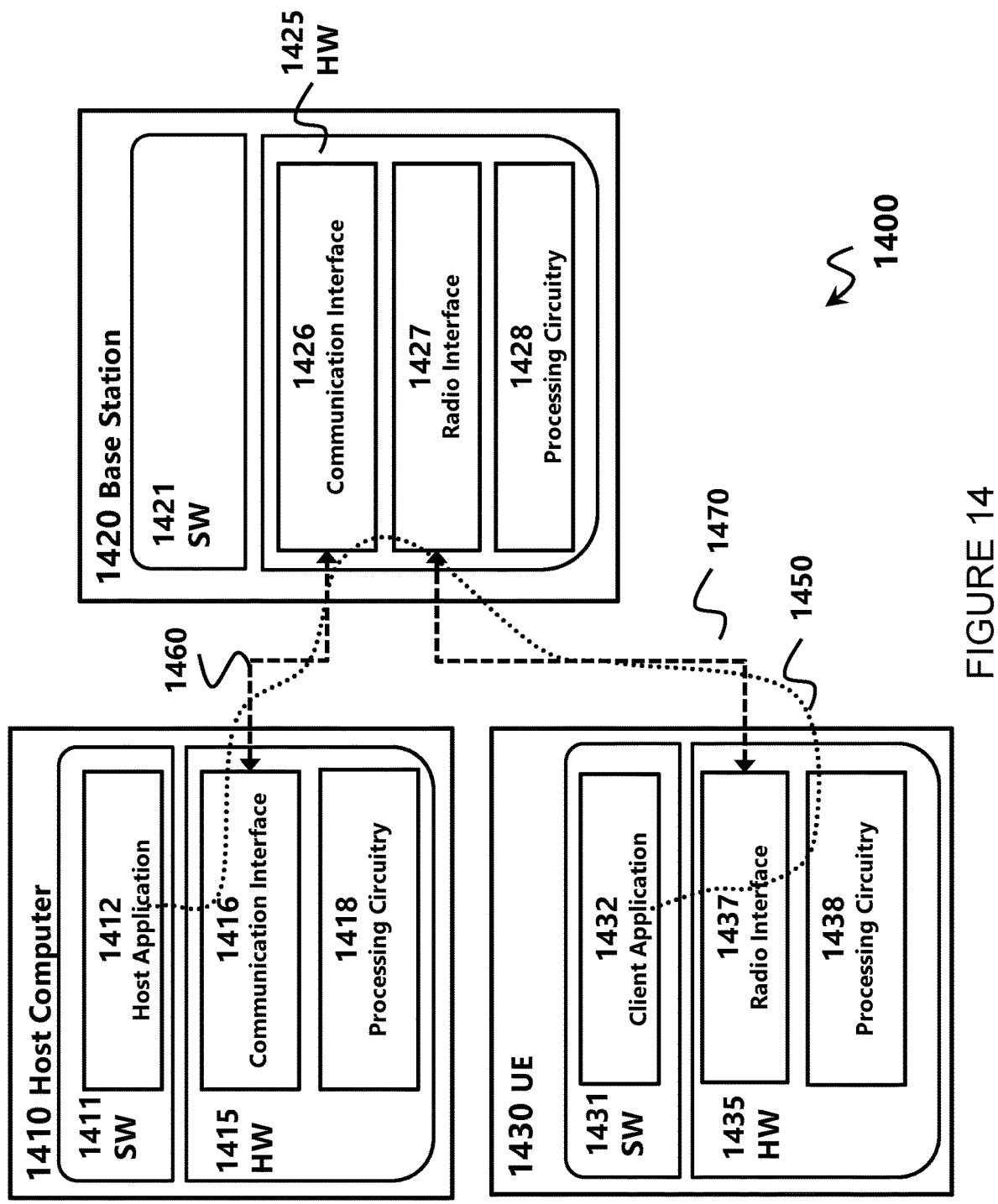
FIG. 14 illustrates an example host computer communicating via a base station with a user equipment over a partially wireless connection, in accordance with certain embodiments.

FIG. 14 illustrates an example host computer communicating via a base station with a user equipment over a partially wireless connection, in accordance with certain embodiments. Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 14 may be similar or identical to host computer 1330, one of base stations 1312a, 1312b, 1312c and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
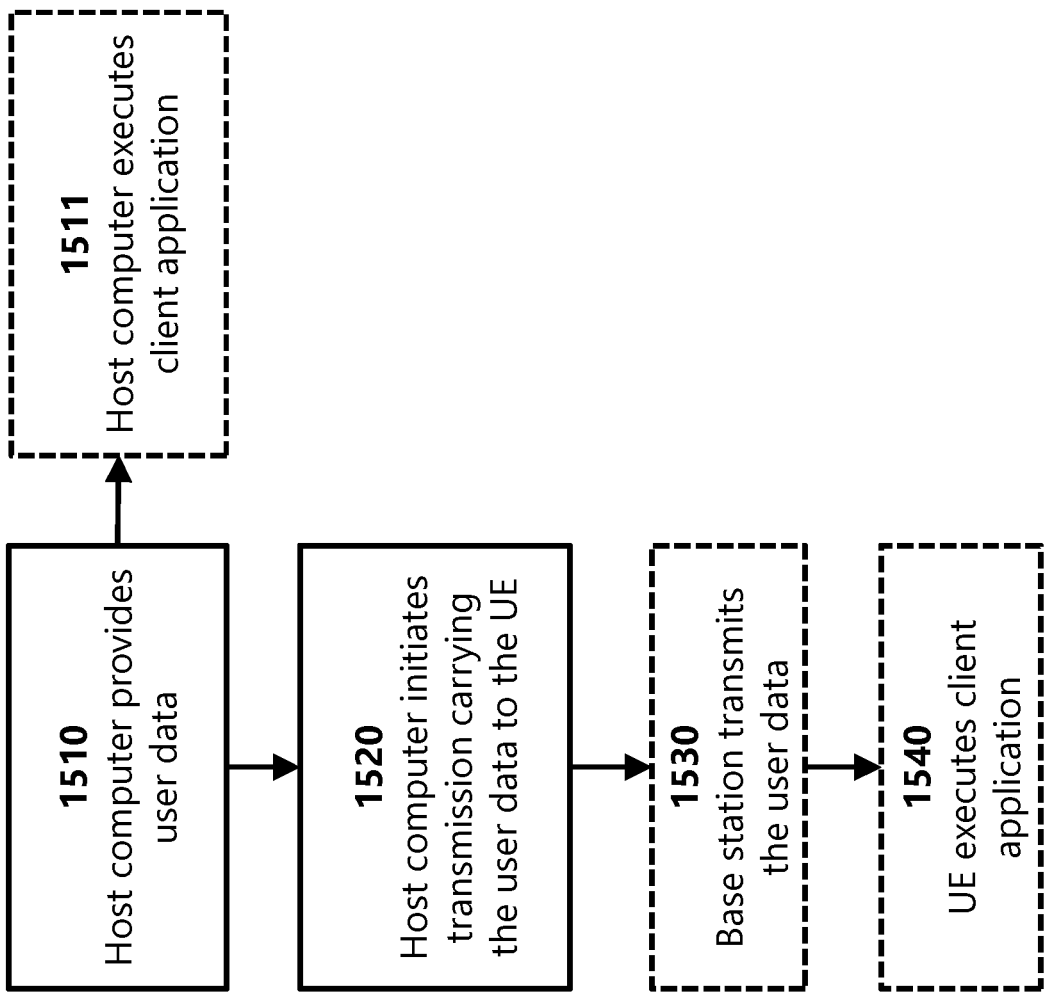
FIG. 15 is a flowchart illustrating an example method implemented in a communication system, in accordance with certain embodiments.

FIG. 15 is a flowchart illustrating an example method implemented in a communication system, in accordance with certain embodiments. More particularly, FIG. 15 illustrates methods implemented in a communication system including a host computer, a base station and a UE, which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
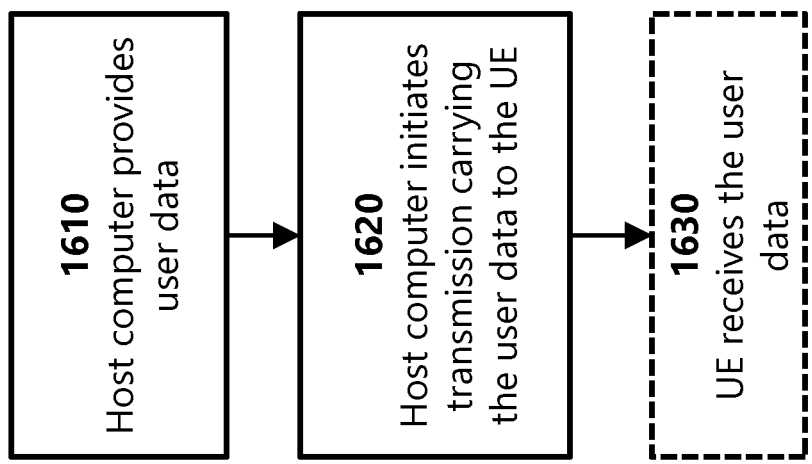
FIG. 16 is a flowchart illustrating a second example method implemented in a communication system, in accordance with certain embodiments.

FIG. 16 is a flowchart illustrating a second example method implemented in a communication system, in accordance with certain embodiments. More particularly, FIG. 16 is a flowchart illustrating a method implemented in a communication system including a host computer, a base station and a UE, which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
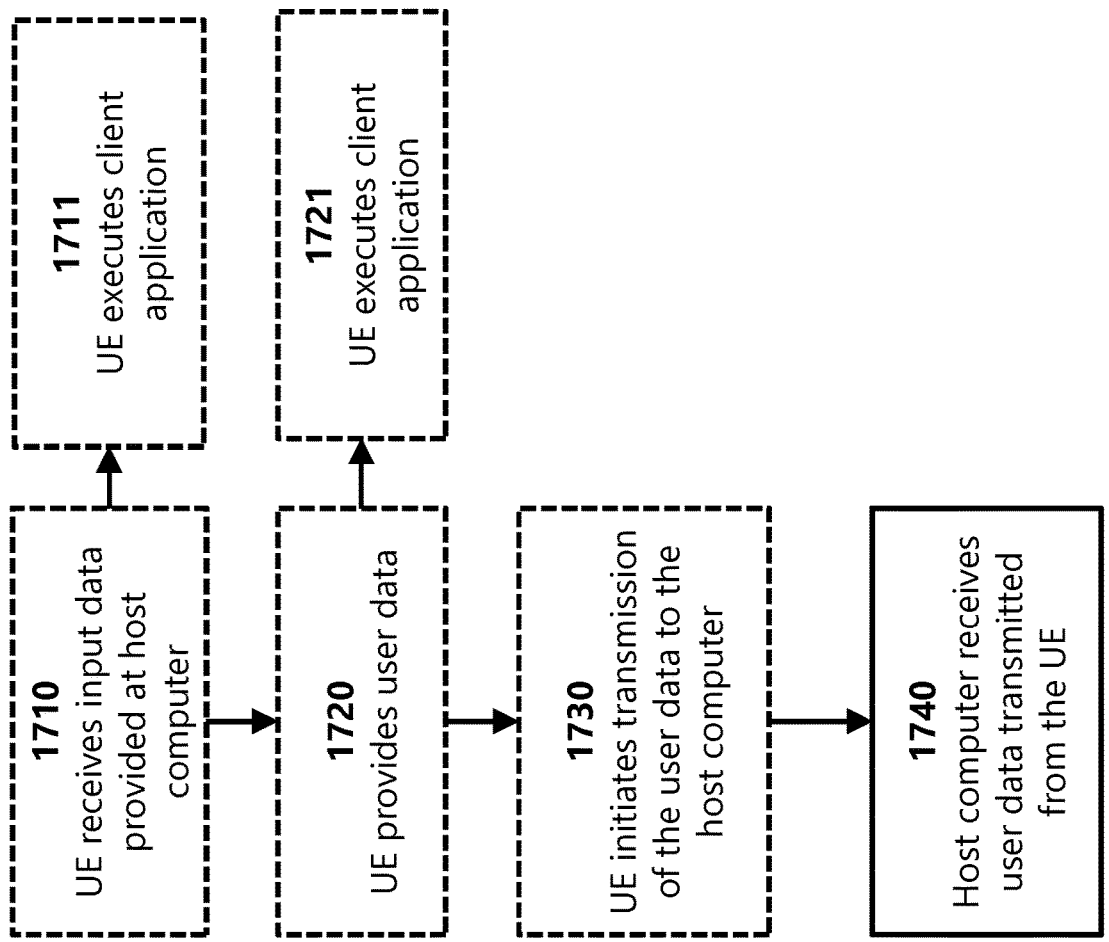
FIG. 17 is a flowchart illustrating a third method implemented in a communication system, in accordance with certain embodiments.

FIG. 17 is a flowchart illustrating a third method implemented in a communication system, in accordance with certain embodiments. More particularly, FIG. 17 is a flowchart illustrating a method implemented in a communication system including a host computer, a base station and a UE, which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
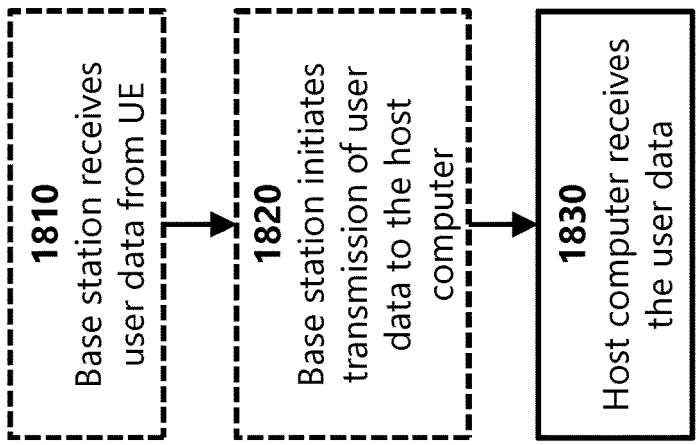
FIG. 18 is a flowchart illustrating a fourth method implemented in a communication system, in accordance with certain embodiments.

FIG. 18 is a flowchart illustrating a fourth method implemented in a communication system, in accordance with certain embodiments. More particularly, FIG. 18 is a flowchart illustrating a method implemented in a communication system including a host computer, a base station and a UE, which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Certain example embodiments contemplated by the present disclosure are described below. Note that the enumerated embodiments below are for purposes of example only, and the present disclosure is not limited to the example embodiments enumerated below.

Group A Embodiments

1. A method performed by a wireless device for uplink (UL) transmission, the method comprising:
    obtaining a configuration for an aggregated UL scheduling pattern, the aggregated UL scheduling pattern comprising UL resources from a plurality of carriers and/or bandwidth parts (BWPs);
    determining one or more of the UL resources from the aggregated UL scheduling pattern based on one or more quality-of-service (QoS) parameters, the one or more QoS parameters indicating one or more QoS requirements associated with a service; and
    performing UL transmission using the one or more determined UL resources.
2. The method of embodiment 1, wherein the aggregated UL scheduling pattern for the wireless device is based on available UL resources of carriers and/or BWPs configured for the wireless device.
3. The method of embodiment 2, wherein the plurality of carriers and/or BWPs are a subset of the UL carriers and/or BWPs configured for the wireless device.
4. The method of any of embodiments 1-3, wherein the wireless device obtains the configuration for the aggregated UL scheduling pattern from at least one or more CG PUSCH configured grants.
5. The method of embodiment 4, wherein the configuration for the aggregated UL scheduling pattern comprises one or more of:
    a configured grant usage for each of the plurality of carriers and/or BWPs;
    a configured time domain resource;
    a configured grant periodicity; and
    a set of configured grant parameters.
6. The method of any of embodiments 1-5, wherein the wireless device obtains the configuration for the aggregated UL scheduling pattern from at least one or more dynamic grants.
7. The method of any of embodiments 1-6, wherein the wireless device obtains the configuration for the aggregated UL scheduling pattern from at least one dynamic grant and at least one CG PUSCH configured grant.
8. The method of any of embodiments 1-7, wherein:
    the one or more QoS parameters indicate a delay requirement of the service; and
    the aggregated UL scheduling pattern fulfills the delay requirement of the service.
9. The method of any of embodiments 1-8, wherein the plurality of carriers comprises a plurality of frequency division duplex (FDD) carriers.
10. The method of any of embodiments 1-9, wherein the plurality of carriers comprises at least one time division duplex (TDD) carrier and at least one frequency division duplex (FDD) carrier.
11. The method of embodiment 10, wherein the plurality of carriers comprises a TDD mid band and an FDD low band.
12. The method of embodiment 10, wherein the plurality of carriers comprises a TDD high band and an FDD low band.
13. The method of any of embodiments 1-10, wherein the plurality of carriers comprises a plurality of time division duplex (TDD) carriers.
14. The method of embodiment 13, wherein the plurality of carriers comprises:
    a time division duplex (TDD) high band; and
    one or more of:
        i. an unsynchronized TDD high band; and
        ii. an unsynchronized TDD mid band.
15. The method of any of embodiments 1-14, wherein the one or more QoS parameters include a 5QI parameter.
16. The method of any of embodiments 1-14, wherein the one or more QoS parameters include a parameter indicating a delay requirement of the service.
17. The method of any of embodiments 1-14, wherein the one or more QoS parameters include a packet delay budget (PDB).
18. The method of any of embodiments 1-17, wherein the aggregated UL scheduling pattern comprises UL resources from a licensed band.

19. The method of any of embodiments 1-18, wherein the aggregated UL scheduling pattern comprises UL resources from an unlicensed band.
20. The method of any of embodiments 1-19, wherein the aggregated UL scheduling pattern comprises UL resources from a supplementary uplink (SUL) carrier.
21. The method of any of embodiments 1-20, further comprising:
providing user data; and
forwarding the user data to a host computer via a transmission to a network node.

Group B Embodiments

22. A method performed by a network node, the method comprising:
determining, based on one or more quality-of-service (QoS) parameters, an aggregated UL scheduling pattern for a wireless device, the aggregated UL scheduling pattern for the wireless device comprising UL resources from a plurality of carriers and/or bandwidth parts (BWPs), the one or more QoS parameters indicating one or more QoS requirements associated with a service.
23. The method of embodiment 22, further comprising: obtaining the one or more QoS parameters.
24. The method of any of embodiments 22-23, wherein the aggregated UL scheduling pattern fulfills the one or more QoS requirements associated with the service.
25. The method of any of embodiments 22-24, further comprising: configuring the wireless device with the aggregated UL scheduling pattern.
26. The method of any of embodiments 22-25, wherein the aggregated UL scheduling pattern for the wireless device is determined based on available UL resources of carriers and/or BWPs configured for the wireless device.
27. The method of embodiment 26, wherein determining the aggregated UL scheduling pattern for the wireless device comprises:
determining the available UL resources of the carriers and/or BWPs configured for the wireless device; and
selecting one or more UL resources from one or more carriers and/or BWPs configured for the wireless device that fulfill the one or more QoS requirements associated with the service.
28. The method of any of embodiments 26-27, wherein the plurality of carriers and/or BWPs are a subset of the carriers and/or BWPs configured for the wireless device.
29. The method of any of embodiments 22-28, wherein the one or more QoS parameters include a 5QI parameter.
30. The method of any of embodiments 22-28, wherein the one or more QoS parameters include a parameter indicating a delay requirement of the service.
31. The method of any of embodiments 22-28, wherein the one or more QoS parameters include a packet delay budget (PDB).
32. The method of any of embodiments 22-31, further comprising:
determining a scheduling transmission instance that fulfills a packet delay budget (PDB) of the service, wherein the aggregated UL scheduling pattern is determined based on the scheduling transmission instance.
33. The method of any of embodiments 22-32, wherein the network node configures the wireless device with the determined aggregated UL scheduling pattern using at least one or more CG PUSCH configured grants.
34. The method of any of embodiments 22-33, wherein the network node configures the wireless device with the determined aggregated UL scheduling pattern using at least one dynamic grant and at least one CG PUSCH configured grant.
35. The method of any of embodiments 33-34, wherein the CG PUSCH configured grant comprises:
configured grant type 1, where RRC signaling is used to provide the uplink grant, including activation of the grant; and/or
configured grant type 2, where RRC signaling provides the transmission periodicity, and L1/L2 control signaling is used to activate/deactivate the transmission.
36. The method of any of embodiments 33-35, wherein determining the aggregated UL scheduling pattern for the wireless device comprises determining one or more of:
a configured grant usage for each of the plurality of carriers and/or BWPs;
a set of time domain hypotheses to fulfill the PDB of the service;
a configured time domain resource;
a configured grant periodicity; and
a set of configured grant parameters.
37. The method of embodiment 36, wherein the CG PUSCH configured grant comprises one or more of:
the configured grant usage for each of the plurality of UL carriers and/or BWPs;
the configured time domain resource;
the configured grant periodicity; and
the set of configured grant parameters.
38. The method of any of embodiments 22-37, wherein the network node configures the wireless device with the determined aggregated UL scheduling pattern using at least one or more dynamic grants.
39. The method of any of embodiments 22-38, wherein the network node configures the wireless device with additional UL resources from one or more carriers using at least one dynamic grant together with the aggregated UL scheduling pattern based on the QoS parameters.
40. The method of any of embodiments 22-39, wherein:
the one or more QoS parameters comprise a delay requirement of the service; and
the aggregated UL scheduling pattern fulfills the delay requirement of the service.
41. The method of any of embodiments 22-40, wherein the plurality of carriers comprises a plurality of frequency division duplex (FDD) carriers.
42. The method of any of embodiments 22-41, wherein the plurality of carriers comprises at least one time division duplex (TDD) carrier and at least one frequency division duplex (FDD) carrier.
43. The method of embodiment 42, wherein the plurality of carriers comprises a TDD mid band and an FDD low band.
44. The method of embodiment 42, wherein the plurality of carriers comprises a TDD high band and an FDD low band.
45. The method of any of embodiments 22-44, wherein the plurality of carriers comprises a plurality of time division duplex (TDD) carriers.

46. The method of embodiment 45, wherein the plurality of carriers comprises:
   a time division duplex (TDD) high band; and
   one or more of:
      i. an unsynchronized TDD high band; and
      ii. an unsynchronized TDD mid band.
47. The method of any of embodiments 22-46, wherein the aggregated UL scheduling pattern comprises UL resources from a licensed band.
48. The method of any of embodiments 22-47, wherein the aggregated UL scheduling pattern comprises UL resources from an unlicensed band.
49. The method of any of embodiments 22-48, wherein the aggregated UL scheduling pattern comprises UL resources from a supplementary uplink (SUL) carrier.
50. The method of any of embodiments 22-49, further comprising:
   obtaining user data; and
   forwarding the user data to a host computer or a wireless device.

Group C Embodiments

51. A wireless device for performing uplink (UL) transmission, the wireless device comprising:
   processing circuitry configured to perform any of the steps of any of the Group A embodiments; and
   power supply circuitry configured to supply power to the wireless device.
52. A network node for performing uplink (UL) resource configuration, the network node comprising:
   processing circuitry configured to perform any of the steps of any of the Group B embodiments;
   power supply circuitry configured to supply power to the wireless device.
53. A user equipment (UE) for performing uplink (UL) transmission, the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.
54. A communication system including a host computer comprising:
   processing circuitry configured to provide user data; and
   a communication interface configured to forward the user data to a cellular network for transmission to a user equipment (UE),
   wherein the cellular network comprises a network node having a radio interface and processing circuitry, the network node's processing circuitry configured to perform any of the steps of any of the Group B embodiments.
55. The communication system of the pervious embodiment further including the network node.
56. The communication system of the previous 2 embodiments, further including the UE, wherein the UE is configured to communicate with the network node.
57. The communication system of the previous 3 embodiments, wherein:
   the processing circuitry of the host computer is configured to execute a host application, thereby providing the user data; and
   the UE comprises processing circuitry configured to execute a client application associated with the host application.
58. A method implemented in a communication system including a host computer, a network node and a user equipment (UE), the method comprising:
   at the host computer, providing user data; and
   at the host computer, initiating a transmission carrying the user data to the UE via a cellular network comprising the network node, wherein the network node performs any of the steps of any of the Group B embodiments.
59. The method of the previous embodiment, further comprising, at the network node, transmitting the user data.
60. The method of the previous 2 embodiments, wherein the user data is provided at the host computer by executing a host application, the method further comprising, at the UE, executing a client application associated with the host application.
61. A user equipment (UE) configured to communicate with a network node, the UE comprising a radio interface and processing circuitry configured to performs the of the previous 3 embodiments.
62. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's components configured to perform any of the steps of any of the Group A embodiments.
63. The communication system of the previous embodiment, wherein the cellular network further includes a network node configured to communicate with the UE.
64. The communication system of the previous 2 embodiments, wherein:
   the processing circuitry of the host computer is configured to execute a host application, thereby providing the user data; and
   the UE's processing circuitry is configured to execute a client application associated with the host application.
65. A method implemented in a communication system including a host computer, a network node and a user equipment (UE), the method comprising:
   at the host computer, providing user data; and
   at the host computer, initiating a transmission carrying the user data to the UE via a cellular network comprising the network node, wherein the UE performs any of the steps of any of the Group A embodiments.

66. The method of the previous embodiment, further comprising at the UE, receiving the user data from the network node.

67. A communication system including a host computer comprising:
communication interface configured to receive user data originating from a transmission from a user equipment (UE) to a network node,
wherein the UE comprises a radio interface and processing circuitry, the UE's processing circuitry configured to perform any of the steps of any of the Group A embodiments.

68. The communication system of the previous embodiment, further including the UE.

69. The communication system of the previous 2 embodiments, further including the network node, wherein the network node comprises a radio interface configured to communicate with the UE and a communication interface configured to forward to the host computer the user data carried by a transmission from the UE to the network node.

70. The communication system of the previous 3 embodiments, wherein:
the processing circuitry of the host computer is configured to execute a host application; and
the UE's processing circuitry is configured to execute a client application associated with the host application, thereby providing the user data.

71. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

72. A method implemented in a communication system including a host computer, a network node and a user equipment (UE), the method comprising:
at the host computer, receiving user data transmitted to the network node from the UE, wherein the UE performs any of the steps of any of the Group A embodiments.

73. The method of the previous embodiment, further comprising, at the UE, providing the user data to the network node.

74. The method of the previous 2 embodiments, further comprising:
at the UE, executing a client application, thereby providing the user data to be transmitted; and
at the host computer, executing a host application associated with the client application.

75. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

76. A communication system including a host computer comprising a communication interface configured to receive user data originating from a transmission from a user equipment (UE) to a network node, wherein the network node comprises a radio interface and processing circuitry, the network node's processing circuitry configured to perform any of the steps of any of the Group B embodiments.

77. The communication system of the previous embodiment further including the network node.

78. The communication system of the previous 2 embodiments, further including the UE, wherein the UE is configured to communicate with the network node.

79. The communication system of the previous 3 embodiments, wherein:
the processing circuitry of the host computer is configured to execute a host application;
the UE is configured to execute a client application associated with the host application, thereby providing the user data to be received by the host computer.

80. A method implemented in a communication system including a host computer, a network node and a user equipment (UE), the method comprising:
at the host computer, receiving, from the network node, user data originating from a transmission which the network node has received from the UE, wherein the UE performs any of the steps of any of the Group A embodiments.

81. The method of the previous embodiment, further comprising at the network node, receiving the user data from the UE.

82. The method of the previous 2 embodiments, further comprising at the network node, initiating a transmission of the received user data to the host computer.

83. A computer program, the program comprising instructions which when executed on a computer perform any one of the methods of the Group A embodiments.

84. A computer program product comprising a computer program, the program comprising instructions which when executed on a computer perform any one of the methods of the Group A embodiments.

85. A computer storage medium comprising a computer program, the program comprising instructions which when executed on a computer perform any one of the methods of the Group A embodiments.

86. A computer storage carrier comprising a computer program, the program comprising instructions which when executed on a computer perform any one of the methods of the Group A embodiments.

87. A computer program, the program comprising instructions which when executed on a computer perform any one of the methods of the Group B embodiments.

88. A computer program product comprising a computer program, the program comprising instructions which when executed on a computer perform any one of the methods of the Group B embodiments.

89. A computer storage medium comprising a computer program, the program comprising instructions which when executed on a computer perform any one of the methods of the Group B embodiments.

90. A computer storage carrier comprising a computer program, the program comprising instructions which when executed on a computer perform any one of the methods of the Group B embodiments.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
1× RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
BWP Bandwidth Part
CA Carrier Aggregation
CC Component Carrier
CCCH SDU Common Control Channel SDU
CDMA Code Division Multiplexing Access
CG Configured Grant
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DCI Downlink Control Information
DL Downlink
DM Demodulation
DMRS Demodulation Reference Signal
DRX Discontinuous Reception
DTX Discontinuous Transmission
DTCH Dedicated Traffic Channel
DUT Device Under Test
E2E End-to-End
E-CID Enhanced Cell-ID (positioning method)
E-SMLC Evolved-Serving Mobile Location Centre
ECGI Evolved CGI
eMBB enhanced Mobile BroadBand
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
MTC Machine-Type Communication
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDB Packet Delay Budget
PDCCH Physical Downlink Control Channel
PDCP Packet Data Convergence Protocol
PDP Profile Delay Profile
PDSCH Physical Downlink Shared Channel
PER Package Error Rate
PGW Packet Gateway
PHICH Physical Hybrid-ARQ Indicator Channel
PIAP Packet Inter-Arrival Periodicity
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
QoS Quality-of-Service
RAN Radio Access Network
RAR Random Access Response
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SCS Subcarrier Spacing
SDF Service Data Flow SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
SUL Supplementary UL
TBS Transport Block Size
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
URLLC Ultra-Reliable and Low Latency Communication
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a network node, the method comprising:
   determining, based on one or more quality-of-service (QOS) parameters, an aggregated uplink (UL) scheduling pattern for a wireless device, the aggregated UL scheduling pattern for the wireless device comprising UL resources from a plurality of carriers, wherein:
      the one or more QoS parameters indicate one or more QoS requirements associated with a service;
      at least one of the one or more QoS parameters indicates a delay requirement associated with the service; and
      determining the aggregated UL scheduling pattern for the wireless device comprises:
         determining two or more carriers that can fulfill the one or more QoS parameters; and
         for each of the two or more carriers, configuring a UL scheduling time, such that the UL resources from the two or more carriers, in the aggregate, fulfill the one or more QoS parameters;
   determining the aggregated UL scheduling pattern for the wireless device comprising determining a set of time domain hypotheses to fulfill a packet delay budget (PDB) of the service.

2. A method performed by a wireless device for uplink (UL) transmission, the method comprising:
   obtaining a configuration for an aggregated UL scheduling pattern, the aggregated UL scheduling pattern comprising UL resources from a plurality of carriers, wherein the configuration for the aggregated UL scheduling pattern is determined based at least on a set of time domain hypotheses to fulfill a packet delay budget (PDB) of the service;
   determining one or more of the UL resources from the aggregated UL scheduling pattern based on one or more quality-of-service (QOS) parameters, wherein:
      the one or more QoS parameters indicate one or more QoS requirements associated with a service; and
      at least one of the one or more QoS parameters indicates a delay requirement associated with the service;
      determining the one or more of the UL resources from the aggregated UL scheduling pattern is in response to two or more carriers that can fulfill the one or more QoS parameters being determined, and for each of the two or more carriers, a UL scheduling time being configured, such that the UL resources from the two or more carriers, in the aggregate, fulfill the one or more QoS parameters; and
   performing UL transmission using the one or more determined UL resources.

3. A network node, comprising:
   a receiver;
   a transmitter; and
   processing circuitry coupled to the receiver and the transmitter, the processing circuitry configured to:
      determine, based on one or more quality-of-service (QOS) parameters, an aggregated uplink (UL) scheduling pattern for a wireless device, the aggregated UL scheduling pattern for the wireless device comprising UL resources from a plurality of carriers, wherein:
         the one or more QoS parameters indicate one or more QoS requirements associated with a service;
         at least one of the one or more QoS parameters indicates a delay requirement associated with the service; and
         determining the one or more of the UL resources from the aggregated UL scheduling pattern is in response to two or more carriers that can fulfill the one or more QoS parameters being determined, and for each of the two or more carriers, a UL scheduling time being configured, such that the UL resources from the two or more carriers, in the aggregate. fulfill the one or more QoS parameters;
      wherein the processing circuitry is configured to determine the aggregated UL scheduling pattern for the wireless device by at least:
         determining which one or more carriers can fulfill the one or more QoS parameters;
         in response to determining that one carrier can fulfill the one or more QoS parameters, configure the wireless device with the UL scheduling pattern derived from the determined carrier;
         in response to determining that more than one carrier can fulfill the one or more QoS parameters, determine the aggregated UL scheduling pattern for the wireless device, such that a combination of UL resources from the determined carriers, in the aggregate, fulfills the one or more QoS parameters;
      the processing circuitry configured to determine, based on or more QoS parameters, the aggregated UL scheduling pattern for the wireless device comprises processing circuitry configured to determine a set of time domain hypotheses to fulfill a packet delay budget (PDB) of the service.

4. The network node of claim 3, wherein the processing circuitry is configured to:
   configure the wireless device with the aggregated UL scheduling pattern.

5. The network node of claim 4, wherein the processing circuitry is configured to configure the wireless device with the aggregated UL scheduling pattern by at least:

configuring the wireless device with one or more subpatterns of the aggregated UL scheduling pattern, wherein each of the one or more subpatterns corresponds to one of the plurality of carriers.

6. The network node of claim 4, wherein the processing circuitry is configured to configure the wireless device with the determined aggregated UL scheduling pattern using at least one configured grant (CG) for one or more Physical Uplink Shared Channel (PUSCH) transmissions.

7. The network node of claim 6, wherein the processing circuitry is configured to configure the wireless device with the determined aggregated UL scheduling pattern using at least one dynamic grant and the at least one CG for one or more PUSCH transmissions.

8. The network node of claim 7, wherein the at least one dynamic grant is carried by downlink control information (DCI).

9. The network node of claim 7, wherein the at least one dynamic grant is carried by Physical Downlink Control Channel (PDCCH).

10. The network node of claim 6, wherein the at least one CG comprises one of:
 a configured grant type 1, wherein radio resource control (RRC) signaling is used to provide an uplink grant, including activation of the grant; and
 a configured grant type 2, wherein RRC signaling provides a transmission periodicity, and L1/L2 control signaling is used to activate and deactivate the transmission.

11. The network node of claim 4, wherein the processing circuitry is configured to configure the wireless device with the aggregated UL scheduling pattern by at least:
 dynamically scheduling the wireless device to transmit in accordance with the aggregated UL scheduling pattern.

12. The network node of claim 11, wherein the dynamic scheduling uses at least one dynamic grant.

13. The network node of claim 3, wherein the processing circuitry is configured to determine the aggregated UL scheduling pattern for the wireless device by at least determining one or more of:
 a configured grant usage for each of the plurality of carriers;
 a configured time domain resource;
 a configured grant periodicity; and
 a set of configured grant parameters.

14. The network node of claim 13, wherein:
 the processing circuitry is configured to configure the wireless device with the determined aggregated UL scheduling pattern using at least one configured grant (CG) for one or more Physical Uplink Shared Channel (PUSCH) transmissions; and
 the at least one CG comprises one or more of:
  the configured time domain resource;
  the configured grant periodicity; and
  the set of configured grant parameters.

15. The network node of claim 3, wherein the processing circuitry is configured to determine the aggregated UL scheduling pattern for the wireless device based on a respective time division duplex (TDD) pattern for at least one carrier configured for the wireless device.

16. The network node of claim 3, wherein the processing circuitry is configured to determine the aggregated UL scheduling pattern for the wireless device based on available UL resources of one or more carriers configured for the wireless device.

17. The network node of claim 16, wherein the processing circuitry is configured to determine the aggregated UL scheduling pattern for the wireless device by at least:
 determining the available UL resources of the one or more carriers configured for the wireless device; and
 selecting one or more UL resources from the one or more carriers configured for the wireless device that fulfill the one or more QoS requirements associated with the service.

18. The network node of claim 16, wherein the plurality of carriers is a subset of the one or more carriers configured for the wireless device.

19. The network node of claim 3, wherein the processing circuitry is further configured to:
 obtain the one or more QoS parameters.

20. A wireless device, the wireless device comprising:
 a receiver;
 a transmitter; and
 processing circuitry coupled to the receiver and the transmitter, the processing circuitry configured to:
  obtain a configuration for an aggregated uplink (UL) scheduling pattern, the aggregated UL scheduling pattern comprising UL resources from a plurality of carriers, wherein the configuration for the aggregated UL scheduling pattern is determined based at least on a set of time domain hypotheses to fulfill a packet delay budget (PDB) of the service;
  determine one or more of the UL resources from the aggregated UL scheduling pattern based on one or more quality-of-service (QOS) parameters, wherein:
   the one or more QoS parameters indicate one or more QoS requirements associated with a service; and
   at least one of the one or more QoS parameters indicates a delay requirement associated with the service; and
  wherein the processing circuitry configured to determine the aggregated UL scheduling pattern for the wireless device comprises a processing circuitry configured to:
   determine two or more carriers that can fulfill the one or more QoS parameters; and
   for each of the two or more carriers, configure a UL scheduling time, such that the UL resources from the two or more carriers, in the aggregate, fulfill the one or more QoS parameters;
  perform UL transmission using the one or more determined UL resources.

* * * * *